United States Patent [19]

Ishida et al.

[11] Patent Number: 4,863,552

[45] Date of Patent: Sep. 5, 1989

[54] HORIZONTAL MULTISTAGE PRESS

[75] Inventors: Reiziro Ishida; Shoichi Inoue; Masao Ariga; Katsumi Yoshida, all of Nagoya; Yoshimi Tsuya, Konan; Yasuyuki Odaira, Komaki; Hisashi Ebina; Shigetoshi Inoue, both of Kani, all of Japan

[73] Assignee: Taihei Machinery Works, Ltd., Aichi, Japan

[21] Appl. No.: 16,672

[22] Filed: Feb. 19, 1987

[30] Foreign Application Priority Data

Feb. 22, 1986 [JP] Japan .................................. 61-38124
Jun. 30, 1986 [JP] Japan ................................ 61-153030

[51] Int. Cl.[4] ......................... B32B 31/00; B32B 31/20

[52] U.S. Cl. ................................ 156/583.1; 100/93 P; 100/215; 100/218; 156/583.91

[58] Field of Search ................ 156/580, 583.1, 583.91, 156/559; 100/93 P, 196, 209, 215, 218; 144/246 C, 245 D, 242 E; 198/699.1, 780

[56] References Cited

U.S. PATENT DOCUMENTS

| | | | |
|---|---|---|---|
| 2,983,635 | 5/1961 | Richardson | 156/555 |
| 3,923,150 | 12/1975 | Jager | 198/780 |
| 3,945,413 | 3/1976 | Eriksson | 198/780 |
| 4,353,416 | 10/1982 | Buschfeld | 156/583.1 |
| 4,385,650 | 5/1983 | Schmidt | 144/246 C |
| 4,615,758 | 10/1986 | Held | 156/381 |
| 4,701,240 | 10/1987 | Kraemer et al. | 156/555 |

FOREIGN PATENT DOCUMENTS

| | | | |
|---|---|---|---|
| 623298 | 12/1935 | Fed. Rep. of Germany | 144/246 C |
| 0058811 | 4/1985 | Japan | 100/215 |
| 0058812 | 4/1985 | Japan | 100/215 |
| 60-79908 | 5/1985 | Japan . | |
| 60-79909 | 5/1985 | Japan . | |
| 60-87005 | 5/1985 | Japan . | |
| 60-99602 | 6/1985 | Japan . | |
| 60-250901 | 12/1985 | Japan . | |
| 61-3701 | 1/1986 | Japan . | |
| 171419 | 2/1960 | Sweden | 100/93 P |

*Primary Examiner*—George F. Lesmes
*Assistant Examiner*—J. Davis
*Attorney, Agent, or Firm*—Stephen G. Rudisill

[57] ABSTRACT

This invention discloses a horizontal multistage press which comprises a pair of frames disposed upright in face-to-face relationship with each other, at least one upper lateral beam disposed to connect the upper portions of the abovementioned pair of frames, at least one lower lateral beam disposed to connect the lower portions of the pair of frames, rails disposed on at least either of such pair of upper and lower lateral beams and extending along the length thereof, a multiplicity of hot plates disposed parallel to one another between the pair of frames and supported by the rails for reciprocal movement along the length of such rails, a multiplicity of unprocessed sheets being heat-pressed between the hot plates, at least one urging means disposed on at least one of the frames for urging the multiplicity of hot plates toward and away from one another, and travel members for loading and unloading the unprocessed and processed sheets in and from the gaps between the hot plates, such travel members including at least one engagement members for engaging the lower ends of the unprocessed and processed sheets.

28 Claims, 28 Drawing Sheets

HORIZONTAL MULTISTAGE PRESS

BACKGROUND OF THE INVENTION

1. Field of the Invention

The present invention relates to a horizontal multistage press in which a plurality of hot plates are disposed between frames provided on opposite sides in face-to-face relation so that they can freely be opened and closed and sheets to be processed, such as pieces of plywood, decorative sheets, and single-sheet veneers are heat-pressed.

2. Description Of the Related Art

In general, a multistage press of the type which is mainly employed during plywood manufacturing processes includes a movable platen capable of freely ascending and descending by means of ram cylinders disposed in a lower frame and a plurality of stages of hot plates provided between an upper frame and the lower frame. The apparatus of this type is arranged in such a manner that, after sheets to be processed have been inserted into the gaps between the respective hot plates, the press is closed by moving the movable platen upwardly to lift up the hot plates step by step from the lowermost hot plate to the uppermost hot plate, thereby obtaining processed sheets by the application of pressure and heat for a predetermined period of time.

This kind of multistage press having a plurality of hot plates disposed one above another in the vertical direction is constructed in such a manner that support lug attached to the four corners of the hot plates are respectively mounted on corresponding ladder-like support members attached to associated columns such as to support the aforesaid hot plates. Therefore, when the thicknesses of the respective hot plates are to be determined, it is necessary to take into consideration the level of strength which the hot plates are required to have in heating and pressing unprocessed sheets and which will be sufficiently resistant to the levels of deflection and curvature formed by the distance between the supporting points of the hot plates. Consequently, the hot plates must have a thickness which is more than would be necessary simply from the viewpoint of rigidity.

In addition, since such hot plates which have a thickness that is more than is necessary and, hence, an increased weight are stacked in a multistage manner, the levels of pressure applied to the sheets processed by means of the hot plates greatly vary as between the uppermost and lowermost plates. This causes imperfect bonding between the elements of a processed sheet and results in its thickness being insufficient. In addition, it is necessary to increase the diameters of the ram cylinders which are the means for moving up and down the respective hot plates, as well as the capacity of the pump employed to supply hydraulic fluid to the cylinders, and this requires a hydraulic-pressure unit of enormous size. As a consequence, the size of the multistage press per se is increased.

For this reason, attempts have been made to correct variations in pressure levels, to eliminate imperfect bonding in sheets pressed and in combination with heat, and to reduce the weight of sheets or the size of a hydraulic pressure unit by employing a horizontal multistage press having upright hot plates arranged side by side, instead of the previously-described vertical multistage press in which a plurality of hot plates are arranged one above another. However, the above-mentioned horizontal multistage press typically requires a device for loading upright sheets to be processed in the gaps between the hot plates and unloading upright processed sheets from therebetween, such hot plates being equally spaced apart in side-by-side relation during the period in which the press is at a standby.

In the light of the aforesaid circumstances, the present applicant achieved a certain degree of improvement in the invention described in Japanese Patent Application No. 109118/1984 and Japanese Patent Laid-open No. 250901/1985, entitled "APPARATUS FOR LOADING AND UNLOADING SHEETS FOR USE WITH HORIZONTAL MULTISTAGE PRESS" and filed by the applicant of the present invention. Referring to the construction of the prior-art apparatus, chain conveyors are disposed at the side of the horizontal multistage press into which unprocessed sheets are loaded and on the other side of the same from which processed sheets are unloaded, the axes of such chain conveyors crossing at right angles the directions in which the sheets are loaded and unloaded. Belt conveyors are disposed parallel to said conveyors with the levels of their upper conveying surfaces higher than those of the chain conveyors. These conveyors are controlled to run at substantially equal speeds, and loader or unloader rack assemblies are secured to the aforesaid chain conveyors, such rack assemblies each having racks at least greater in number than the total numbers of hot plates and being in phase with the associated gaps between the hot plates when they are placed upright in side-by-side relation during the period in which the press is at a standby. In addition, sheet loading and unloading conveyors are disposed and adapted to move up and down relative to the level of the upper conveying surfaces of the aforesaid belt conveyors, thereby enabling the loading and unloading of sheets. This arrangement enables the loading of sheets to be processed from the loader racks into the gaps between the hot plates and the unloading of processed sheets from the hot plates into the gaps between the unloader racks during the period in which the press is at a standby, thereby attaining a reasonably suceessful result.

However, each of the individual single-sheet veneers which are combined to form an unprocessed sheet includes to some extent defects such as unevenness, curvature and twisting. Furthermore, certain kind of raw lumber manifests these phenomona conspicuously during the cutting of the raw lumber into single-sheet veneers or shortly after the cutting. These single-sheet veneers are superposed upon each other and temporarily bonded to form a sheet to be processed. When the thus-obtained unprocessed sheets are to be loaded from the loader racks into the gaps between the hot plates by means of driving the sheet loading and unloading conveyors with their sheet carrying surfaces flush with each other, the leading ends of the unprocessed sheets may collide with the insertion guides that are formed on the associated ends of the hot plates. Even if the leading ends are successfully inserted into the gaps between the hot plates, the unprocessed sheets may get blocked at intermediate portions of the passages before they are completely loaded in place between the hot plates, so that it is impossible to completely heat them.

There is also raw lumber of the kind in which, as described above, a camber is formed on processed sheets which have been heat-pressed by the stress produced by heating. Even if the processed sheets clamped between the hot plates are temporarily lifted above the sheet carrying conveyor by the lifters and are to be loaded in the unloader racks in cooperation with the sheet loading and unloading conveyors, the sheets may get blocked in the gaps between the hot plates. Or may collide with the unloader racks, so that it is impossible to completely unload the processed sheets.

The loader and the unloader for unloading and loading the sheets are generally disposed close to each other. However, since they need to be separately driven, the loader and the unloader are fixedly disposed at a predetermined interval. Therefore, in order to transfer the unprocessed sheets from the loader racks to the hot-plate side and the processed sheets from the hot-plate side to the unloader racks, the gaps between the loader racks, the hot plates, and the unloader racks must be arranged in phase.

However, the loader or unloader provided in the related arts has a tendency to involve discrepancies between the respective racks and the hot plates by reason of mechanical errors caused by aging or thermal expansion of members that support the respective racks. Thus, the unprocessed and processed sheets may collide with the ends of the hot plates and the unloader racks, respectively.

In addition, if the sheets to be processed display some degree of camber, there is some risk of them colliding with the ends of the unloader racks. In particular, in cases where the unprocessed plywood sheets are temporarily bonded and each single-sheet veneer which constitutes the plywood is of an irregular shape at the four edges and hence easily exfoliated, when the plywood sheet is loaded, a portion thereof may be bent by contact with one end of the hot plate. If the sheet is heat pressed in the bent state, the result is to produce defective products.

Moreover, during the maintenance of the loader and unloader or when small pieces of lumber and dust accumulated during the operation are to be removed, the close disposition of the loader and unloader results in hindrance to such tasks as cleaning.

Normally, when a plurality of cylinders are to be disposed in the lower frame of a vertical multistage press, the movable platen is held to allow the rams to be placed at substantially the center of the hot plates, whereby well-balanced pressure is applied to the substantial center thereof. The sheets to be processed are pushed at their trailing ends by pushers, inserted into the gaps between the hot plates, and respectively centered on the hot plates. Thus, the pressure point of heat pressing is located substantially at the center of the respective sheets to be processed, so that well-balanced pressure can be applied over the whole of the sheet from the center to the four edges. Also, according to this mechanism, even if there is a difference between the sizes of unprocessed sheets, the sheets can be centered on the hot plates by adjusting the working range of the pushers as the occasion demands, thereby providing the aforesaid well-balanced pressure.

However, in general, a horizontal multistage press is arranged in such a manner that sheets to be processed are not overlaid on the hot plates which are placed upright in side-by-side relation, but the unprocessed sheets are inserted into the gaps between the hot plates in a substantially upright manner with the lower ends of the sheets being held. It is therefore impossible to lift the lower ends of the unprocessed sheets up to a height more than the level of the lower ends of the hot plates. As a result, when the length and width of the unprocessed sheets are relatively enlarged or reduced, the respective pressure positions in the vertical direction and in the direction of travel of the unprocessed sheets are shifted and the pressure balance between the center and the four edges are lost. In addition, the processed sheets involve the drawbacks such as reduced thicknesses thereof and exfoliation attributed to unproper application of pressure.

In general, a typical press is arranged in such a manner that water vapor, hot oil or other heating media is supplied to the interiors of the respective hot plates, and is maintained at temperatures between 110° and 180° C., depending on the kind of each sheet to be processed.

Right and left frames and movable platen as essential constituent members for a multistage hot press are reinforced by beams disposed in their hollow internal spaces in a welded manner, and they are respectively shaped in the form of a sealed box. Since the members are always heated by temperatures provided by the hot plates, a thermal strain occurs therein. This forms a cause of producing hindrance to the opening and closing of the hot plates and reduction in the thicknesses of the sheets which have been processed.

For this reason, the frames and the movable platens are constructed as shown in FIGS. 41 and 42 in such a manner that rib plates 130 are combined longitudinally and laterally at predetermined intervals so as to constitute a lattice, and in addition side plates 131 are disposed on the edges of the thus-obtained structure, the respective contacts in the structure being united with each other by welds 132. The structure is formed into a lattice-like structure 133 having opposite open ends thereof in the direction of application of pressure, that is, on the right and left sides, so as to prevent overheating by air insulation effects.

It is true that this lattice-like structure 133 provides a certain degree of cooling effects as compared with complete box type structures; however, it is impossible to suppress strain stress which might be caused by the thermal expansion of the aforesaid movable platens during a heating step.

SUMMARY OF THE INVENTION

It is therefore an object of the present invention to provide a horizontal multistage press in which, even when the thickness of a sheet to be processed is increased up to more than an initially preset value owing to the modification of specifications, adjustment can be easily and effectively performed with respect to such variation without the need of special operations for extending the gaps between the hot plates of the press.

It is another object of the present invention to provide a horizontal multistage press which is capable of achieving a well-balanced pressure by pressing the center of the unprocessed sheets each having a different size, resulting in the elimination of drawbacks such as a reduction in the thicknesses of the processed sheets attributed to the shift of a pressure point and exfoliation produced generally at the edge portions of the processed sheet.

It is another object of the present invention to provide a horizontal multistage press capable of suppressing the occurrence of a stress caused by strain even when, during heat-pressing, a temperature difference occurs between one side of the movable platens or the frames which is brought into contact with the hot plates and the other side thereof which is out of contact therewith.

It is another object of the present invention to provide a horizontal multistage press capable of maintaining parallelism between respective constitutent members during heat-pressing, and preventing various drawbacks involved with the opening and closing of the hot plates and a reduction in the thicknesses of processed sheets after heat-pressing.

It is another object of the present invention to provide a horizontal multistage press having a reduced number of parts and welded portions and capable of shortening a time taken to process the sheets.

It is another object of the present invention to provide a horizontal multistage press in which constitutent devices can be spaced apart and various kinds of work can be easily performed.

It is a yet another object of the present invention to provide a horizontal multistage press which, even when the number of the hot plates are increased, allows the simplification of the structure without entailing the risk of deflecting nor bending upper and lower beams.

It is a yet another object of the present invention to provide a horizontal multistage press in which two groups of unprocessed sheets different in size and thickness can be loaded in the gaps between the hot plates on both sides of a central frame at the same time or separately.

It is a further object of the present invention to provide a horizontal multistage press in which the vapor produced from the unprocessed sheets by heating can be discharged without being condensed on lifter portions, thereby eliminating various drawbacks affecting the sheets to be processed.

To these ends, the present invention comprises a pair of upright frames facing each other, at least one upper lateral beam connecting the two frames at their upper portions, at least one lower lateral beam connecting the two frames at their lower portions, rail means overlying at least either of the upper and lower lateral beams and extending in the longitudinal direction thereof, a multiplicity of hot plates disposed parallel to each other between the two frames and supported by the rail means for reciprocal movement along the length of the rail means, a multiplicity of unprocessed sheets being heat-pressed in the gaps between the hot plates, at least one urging means disposed on at least either of the two frames for urging the multiplicity of hot plates to move toward and away from each other, and conveying means arranged to load the unprocessed sheets in between the hot plates and unload the processed sheets from therebetween and having at least one engagement means for engaging with the lower ends of the unprocessed sheets for carrying purposes..

Other and further objects of the present invention will be apparent from the following description of preferred embodiments and claims appended hereto, and many advantages which are not herein referred to will be readily understood by those skilled in the art by embodying the present invention.

DETAILED DESCRIPTION OF THE PREFERRED EMBODIMENTS

Figure 1A:
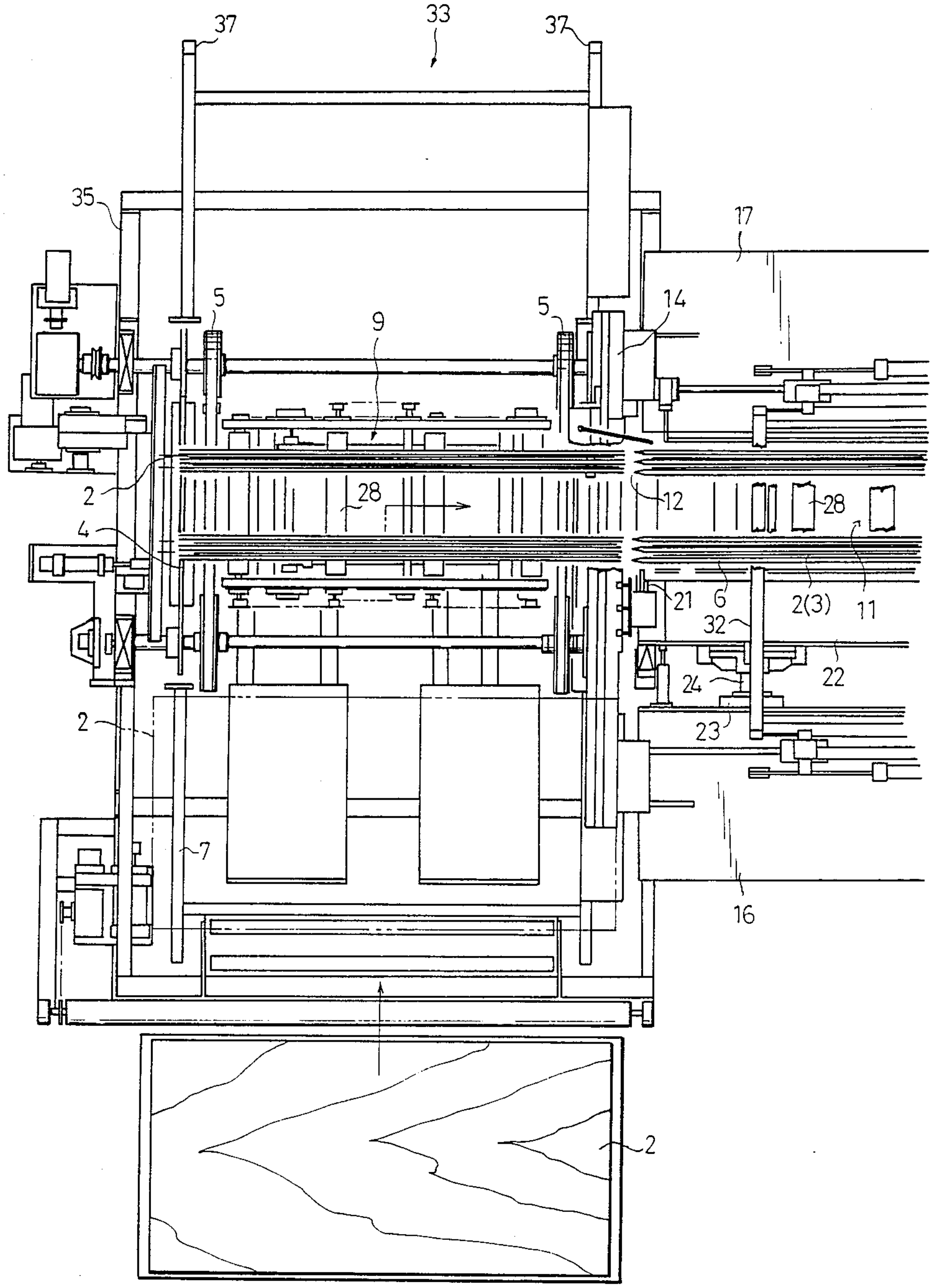
FIGS. 1A and 1B are respectively plan views schematically showing the overall structure of a first preferred embodiment of the present invention.
Figure 1B:
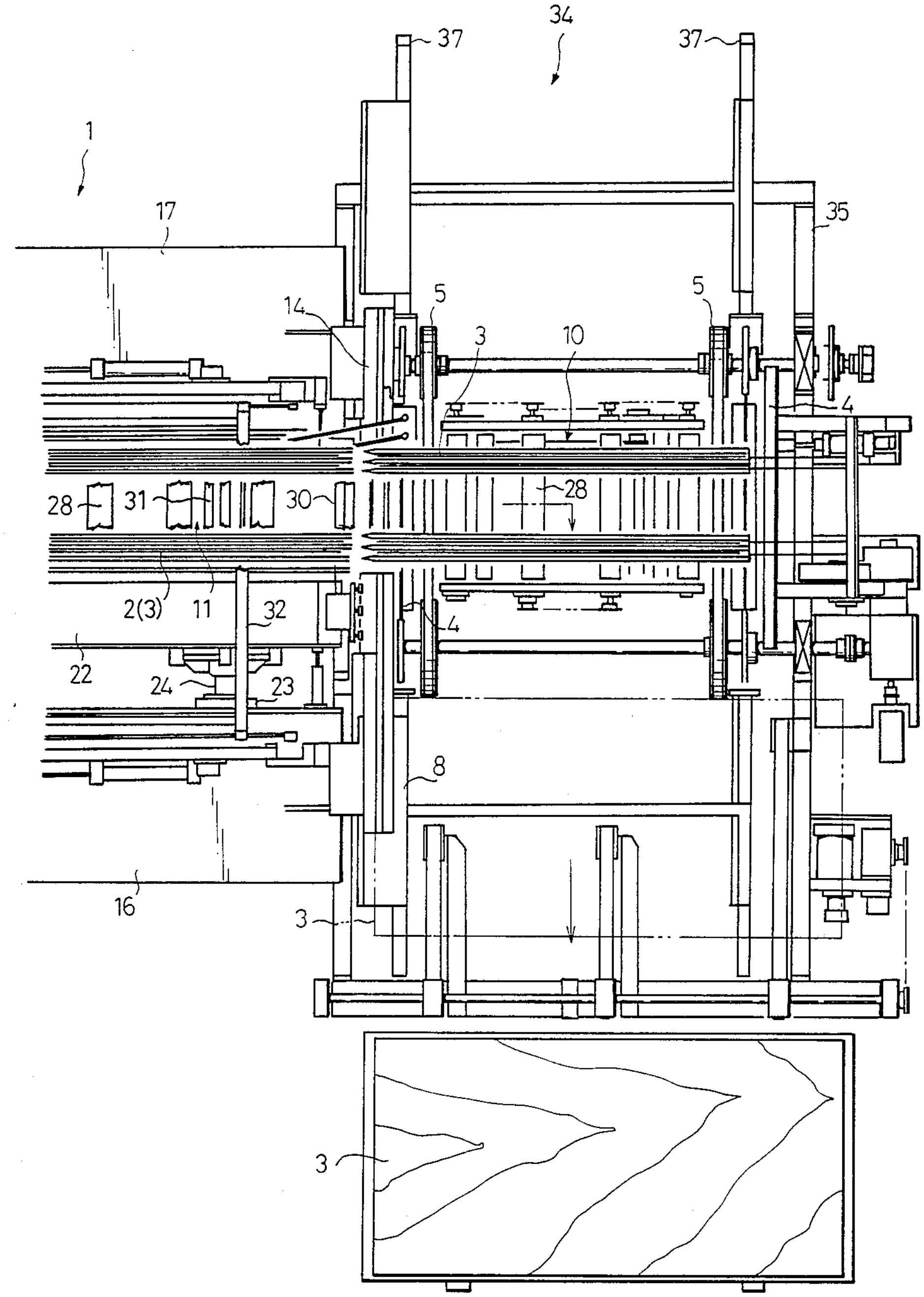

The first preferred embodiment of the present invention will be described below with reference to FIGS. 1A to 8, and its construction is first explained.

Referring to FIGS. 1A to 3, two pairs of upper and lower lateral beams 14 and 15 are respectively disposed at given intervals in the vertical direction and on the front and rear sides, in the direction of travel of sheets to be processed, right and left frames 16 and 17 being mounted in face-to-face relation by the upper and lower lateral beams 14 and 15. A rail 18 is mounted on one of the upper lateral beams 14 and an engagement rail 19 is mounted on the other thereof. A plurality of hot plates 6 and a movable platen 22 are suspended from the rails 18 and 19 by means of engagement members 20 engaged with the engagement rail 19 and moving members 21 disposed on the rail 18. A plurality of hydraulic cylinders 23 are fitted into the openings of the aforesaid left frame 16 at substantially equal intervals, and ends of rams 24 are attached to the movable platen 22. The hot plates 6 respectively have insertion guides 12 at their ends on the side on which the unprocessed sheets 2 are loaded, such insertion guides 12 constituted by sharp edges each having a substantially triangular shape in cross section.

Figure 2A:
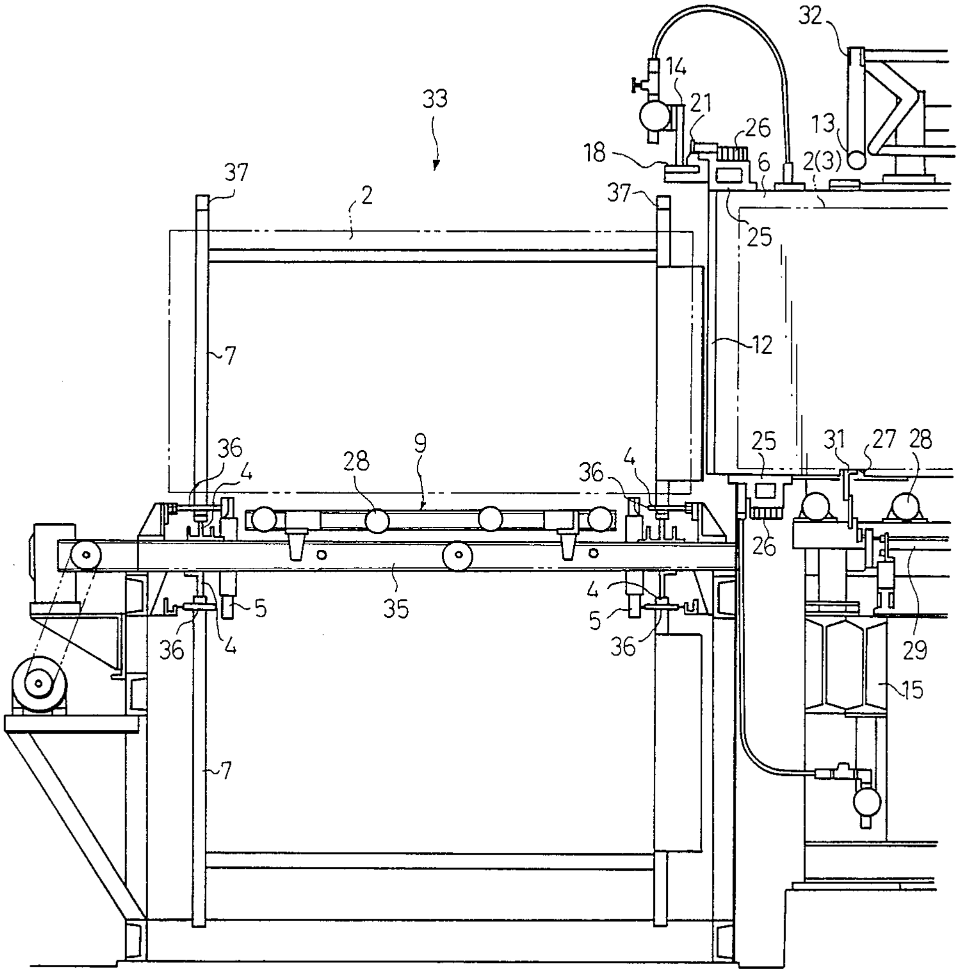
FIGS. 2A and 2B are respectively side elevational views of the first embodiment shown in FIGS. 1A and 1B.
Figure 2B:
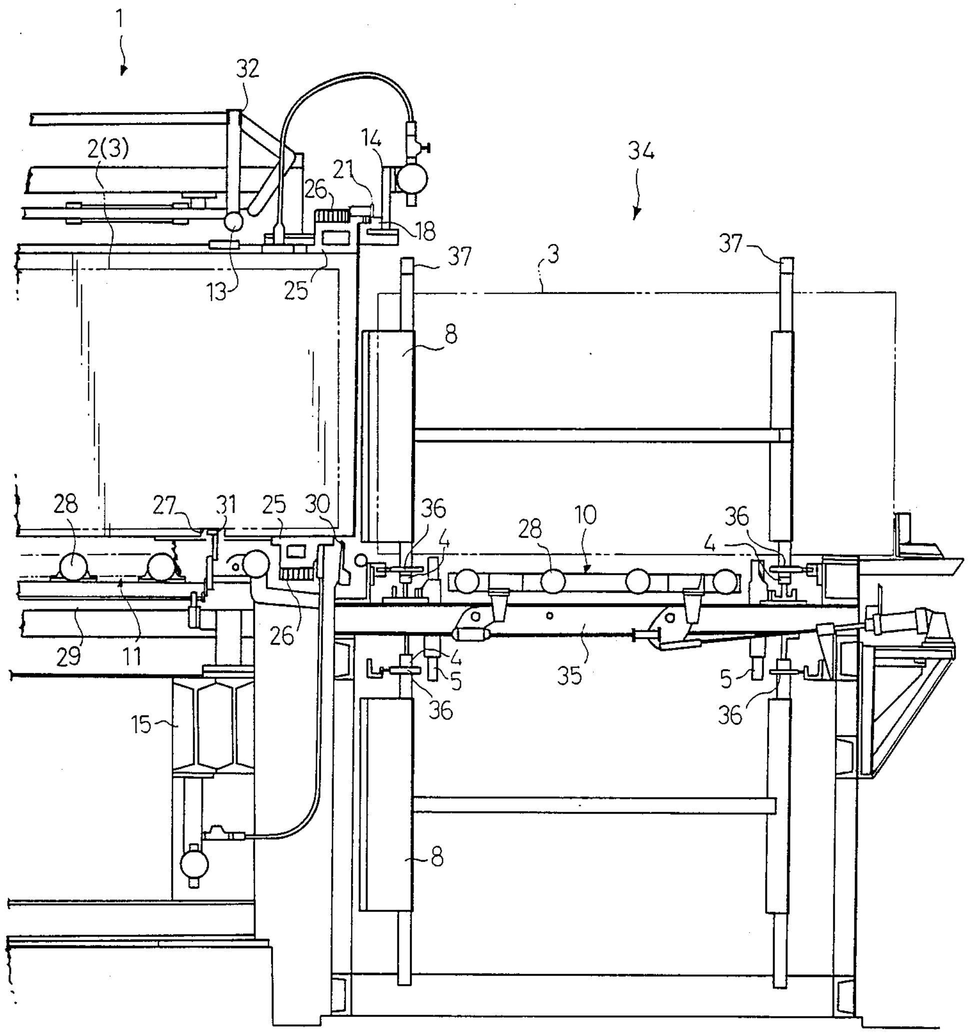
Figure 3:
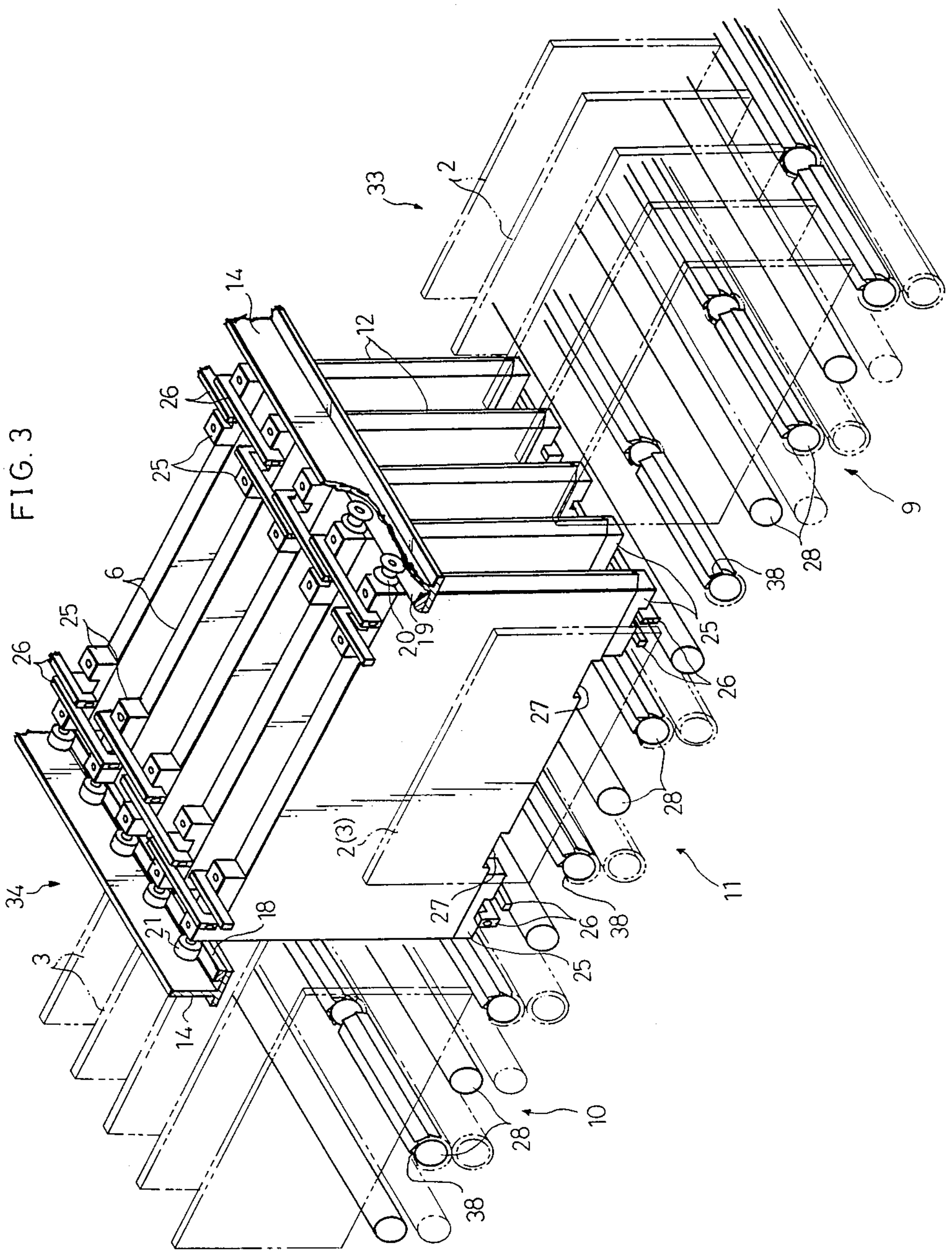
FIG. 3 is a perspective view of the essential portion of the present invention.

Brackets 25 are mounted on the right and left ends of the upper and lower sides of the respective hot plates 6 and the movable platen 22, or on the upper and lower opposite ends as shown in FIGS. 2 and 3, i.e., in the vicinity of the respective four corners of the hot plates 6, such that they will not prevent the unprocessed sheets 6 to be loaded and unloaded. Channel-like limiting members 26 are provided across the respective adjacent brackets 25. Each of the limiting members 26 have one end mounted on the associated bracket 25 and the other free. During the period in which the press is at a standby, the free ends of the limiting members 26 are engaged with the brackets 25 so as to maintain the gaps between the respective hot plates 6 and the movable platen 22 at equal intervals.

A pair of cutouts 27 spaced apart at a given interval are respectively formed in the lower end of the aforesaid hot plates 6. A sheet carrying conveyor 11 is disposed under the cutouts 27 and between the press frame 29 mounted on the lower lateral beams 15, such a conveyor 11 including a plurality of rolls 28 which are used to load and support the unprocessed sheets 2 and to unload processed sheets 3.

A stopper 30 is disposed near the sheet-unloading side of the conveyor 11 with the sheet stopping position being freely moved in the direction of travel Of the sheet 2 by means of screw mechanisms or hydraulic mechanisms mounted on the lower beams 15. A pair of lifters 31 are disposed between the loading and unloading ends of the sheet carrying conveyor 11, and can be positioned above and below the level of the sheet carrying surface of the conveyor 11 so as to protrude into and retract from the aforesaid cutouts 27 of the hot plates 6. Each of the lifters 31 is substantially equivalent in length to the length between the outermost hot plates 6 during the period in which the press is at a standby. A pair of coupling beams 32 are disposed between the left and right frames 16 and 17 for free vertical movement by means of a hydraulic mechanism. The respective coupling beams 32 are provided with pushers 13 for each gap between the hot plates 6 during the period in which the press is at a standby.

A loader 33 and an unloader 34, which will be described below, are disposed on one side of the horizontal multistage press on which the unprocessed sheets 2 are loaded and on the other side from which the processed sheets 2 are unloaded.

Specifically, endless chain conveyors 4 are provided in pairs at an equal interval on respective frames 35 of the loader 33 and the unloader 34, and the loader racks 7 having spacers 37 at their tops are connected to the chain conveyors 4 by attachments 36 with a gap between the hot plates 6 when the press is at a standby while the unloader racks 8 being mounted in the same manner as described above. Between the respective chain conveyors 4 are disposed means including a large-diameter pulley or pulleys disposed at positions at which the sheets 2 and 3 are turned around and assisting in transferring the unprocessed sheets 2 and the processed sheets 3. Alternatively, as the illustrated example, belt conveyors 5 are disposed to be driven at substantially the same speed as those of the chain conveyors 4, supporting the lower ends of the unprocessed and processed sheets 2 and 3. On the aforesaid frames 35 are disposed a sheet loading conveyor 9 and a sheet unloading conveyor 10 capable of moving above and below the level of the carrying surfaces of the belt conveyors 5 and at their upper limits being flush with the level of the carrying surface of the aforesaid sheet carrying conveyor 11.

The rolls 28 will be described below with reference to FIGS. 3 to 7, such rolls 28 constituting part of the sheet loading conveyor 9 of the loader 33, the sheet carrying conveyor 11 of the horizontal multistage press, and the sheet unloading conveyor 10 of the unloader 34.

Specifically, some or all of the rolls 28 are provided with projections 38 for applying forcible drive forces by engaging with the lower ends of the unprocessed sheets 2 and the processed sheets 3. This arrangement prevents the phenomenon of sheets getting blocked in the gaps between the hot plates 6 and between the unloader racks 8 owing to bending, camber or other factors. In the illustrated example, the projections 38 are provided around every other roll 28. In particular, the sheet carrying conveyor 11 includes the rolls 28 having the projections 38 which, in principle, can freely ascend and descend, but only the roll 28 on the sheet-loading side is fixedly disposed.

Figure 4:
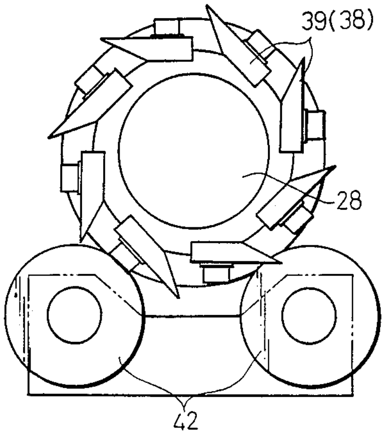
FIG. 4 is a side elevational view schematically showing an example of a roll with projections formed on the periphery used in the present invention.
Figure 5:
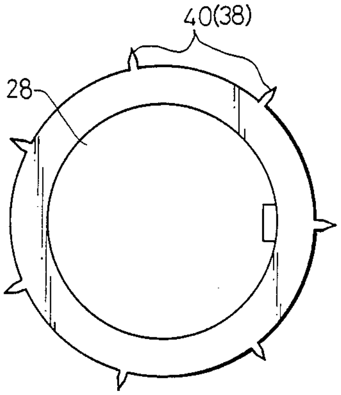
FIGS. 5 and 6 are respectively side elevational views of other examples of the roll with projections shown in FIG. 4.
Figure 6:
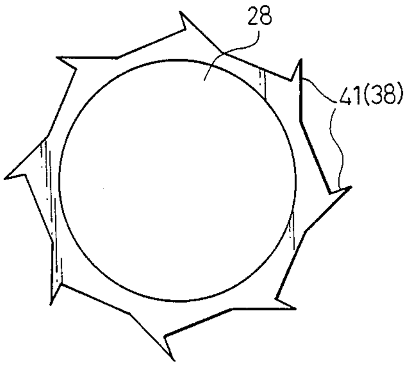
Figure 7:
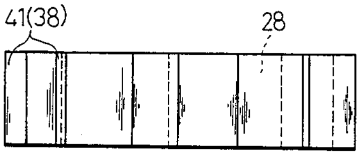
FIG. 7 is a plan view schematically showing the roll in FIG. 6.

Also, in the first preferred embodiment illustrated in FIGS. 3 to 4, the projections 38 is constituted by a plurality of knives 39 bolted at equal angular intervals, such knives 39 each having a predetermined length along the longitudinal axes of the respective rolls 28. Otherwise, as shown in FIG. 5, a plurality of needle-like projections 40 may respectively be formed at equal angular intervals along the outer circumferences of the rolls 28, or, as shown in FIGS. 6 to 7, protruding portions 41 may be formed at equal angular intervals in such a manner as to be inclined at a predetermined angle in the direction in which driving forces are applied. The aforesaid needle-like projections 40 or protruding portions 41 are fitted onto the rolls 28 in an annular shape or in block form.

Figure 8:
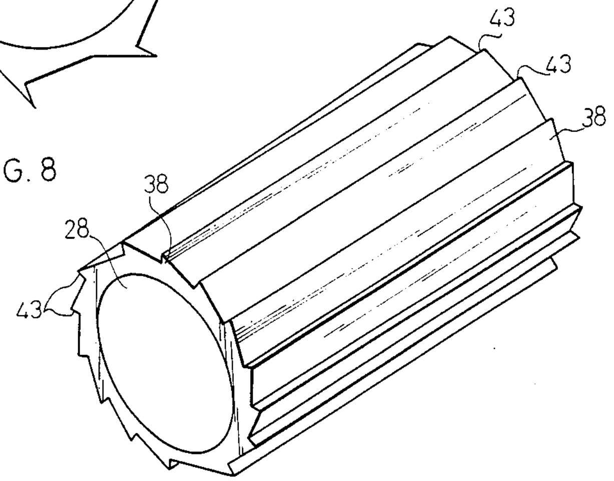
FIG. 8 is a perspective view schematically showing yet another example of the roll with projection.
Figure 9:
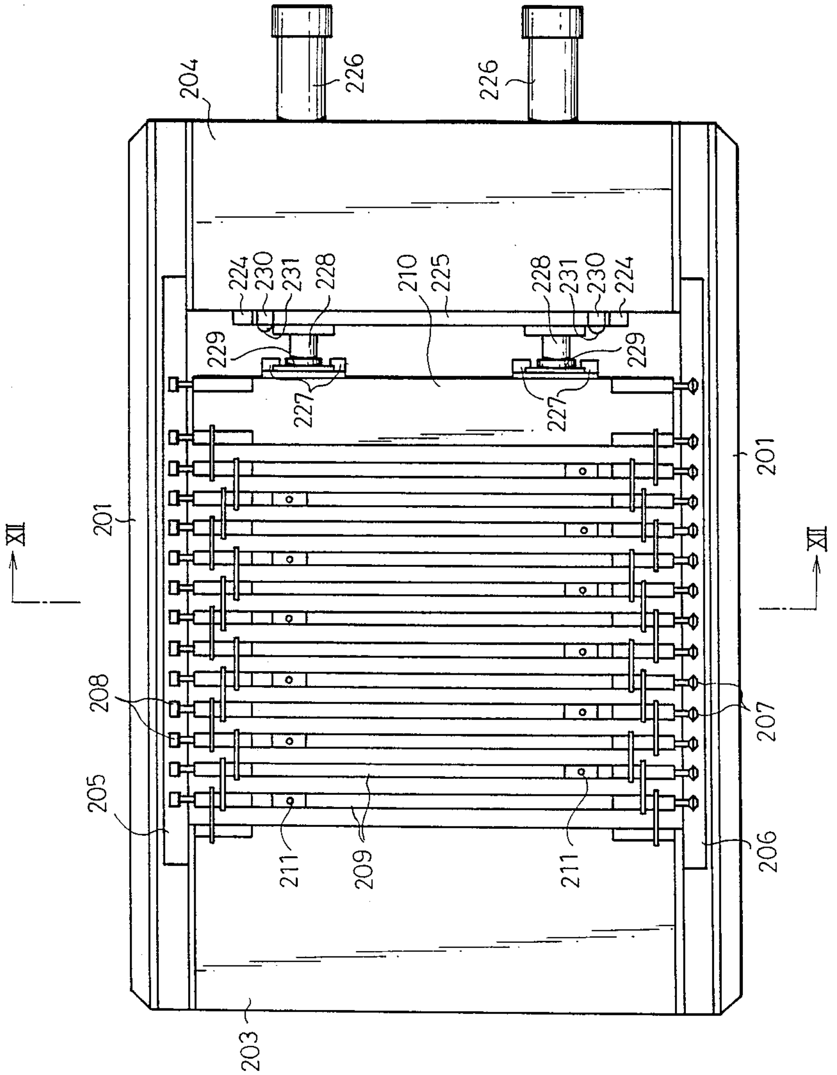
FIG. 9 is a plan view schematically showing a second preferred embodiment of the present invention.
Figure 10:
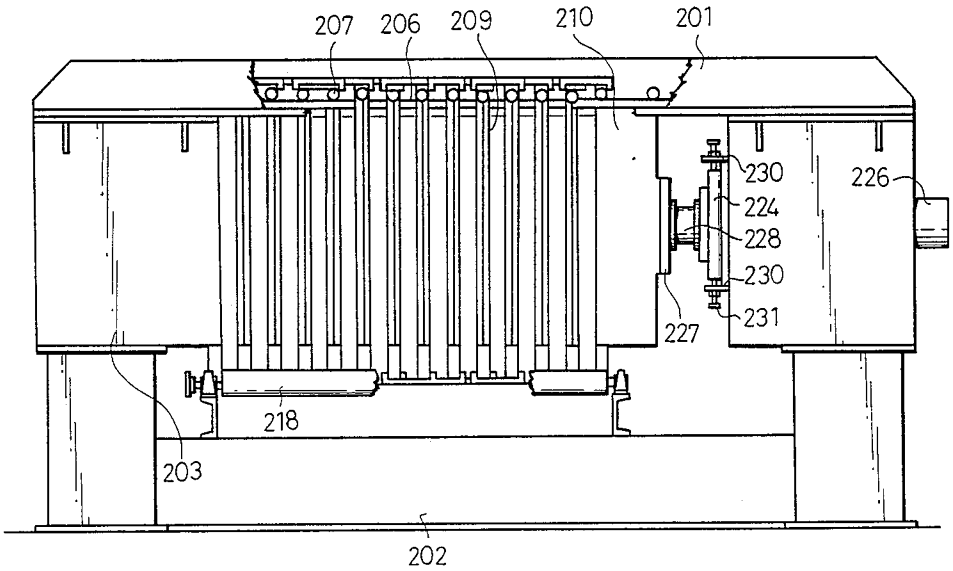
FIG. 10 is a side elevational view of the embodiment shown in FIG. 9.

In the aforesaid example, the projections 38 are fitted onto the respective rolls 28. FIG. 8 shows another example in which recesses 43 are formed as the projections 38 in the roll 28 per se at predetermined angular intervals. A method of forming the recesses 43 is to directly cut the recesses 43 parallel to the longitudinal axis of the roll 28 which is formed in a solid manner or the roll 28 which is hollow but having a thick section. Another method is to produce the forged or cast-steel roll 28 integral with the recesses 43 from a casting or die having the recesses 43. Therefore, in cases where the gaps between the projections 38 are made narrow in order to smoothly convey the unprocessed or processed sheets 2 or 3, the latter method of forming the recesses 43 is capable of simplying production processes as compared with the former method of fitting the projections 38 onto the roll 28.

It should be noted that, in order to support the unprocessed sheets 2 and the processed sheets 3 and to prevent deflection from being caused by their loads when they are conveyed, as shown in FIG. 4, bearings 42 may be disposed at locations where is positioned no projection 38 extending along the length of the roll 28.

The operation of the first preferred embodiment will be described below.

First, when the hydraulic cylinders 23 are operated to retract the rams 24, the movable platen 22 and the respective hot plates 6 are moved by moving members 21 engaged with the rails 18 and 19 along the rails 18 and 19 between the upper lateral beams 14, the movable platen 22 and the hot plates 6 being kept parallel to one another on one side thereof by the engagement between the engagement rail 19 and the engagement members 20. While the members 22 and 6 are being moved, the free ends of the limiting members 26 are engaged with associated brackets 25 of the adjacent hot plates 6 at the four corners of the respective hot plates 6 from left to right. The maximum opening lengths are sequentially limited to uniformly hold the gaps of the respective hot plates 6, thereby allowing the press to be at a standby.

During this time, each time the respective loader racks 7 stand upright from a sheet-inserting plane by driving the chain conveyors 4, the belt conveyors 5 or the pulleys (not shown) of the loader 33, each of the unprocessed sheets 2 is inserted into each gap between the loader racks 7 until all the gaps between the loader racks 7 are filled with the unprocessed sheets 2. The loader racks 7 are made to wait at a location in which they are in phase with the gaps between the hot plates 6 during the period in which the press is at a standby.

During the press standby period, the sheet loading conveyor 9 is projected above the level of the carrying surfaces of the chain conveyors 4 or the belt conveyors 5, and the carrying surface of the sheet loading conveyor 9 is made to flush with the level of the carrying surface of the sheet carrying conveyor 11, thereby supporting the lower ends of the unprocessed sheets 2. Subsequently, when the sheet loading conveyor 9 and the sheet carrying conveyor 11 are driven in synchronism with each other, all the unprocessed sheets 2 are loaded together into the gaps between the respective hot plates 6 which are maintained at a predetermined temperature by supply of a heat medium.

While the unprocessed sheets 2 are being loaded into the gaps between the hot plates 6, the lower ends of the unprocessed sheets 2 are engaged with the projections 38 disposed around the rolls 28 and the rotations of the rolls 28 are transmitted to the sheets 2. Therefore, even if uneveness, twisting or curvature is formed on the unprocessed sheets 2, the unprocessed sheets 2 are forcibly loaded into the gaps between the hot plates 6. After a predetermined passage of time, the roll 28 having the projections 38 is first moved downwardly from among the rolls 28 constituting part of the sheet carrying conveyor 11. The unprocessed sheets 2 which have been loaded in the gaps between the hot plates 6 are supported at their lower ends by the normal rolls 28 having no projections 38, and the lower edges of the leading ends of the sheets 2 are limited by the stopper 30. The stopper 30 is arranged to make coincide the centers of the unprocessed sheets 2 which have been loaded with the centers of the hot plates 6 between the leading and trailing ends thereof. At this time, even if some of the unprocessed sheets 2 are loaded at a delayed timing due to the conspicuous formation of unevenness, twisting and bending, they are forcibly loaded by the roll 28 having the projections 38 and fixedly disposed on the sheet-loading side.

When it has been detected the fact that all the unprocessed sheets 2 are loaded from the respective loader racks 7 into the associated gaps between the hot plates 6, the sheet loading conveyor 9 is stopped and moved down to the lower limit. Preparatory to the following working, as previously described, the next group of the unprocessed sheets 2 are loaded into the gaps between the loader racks 7. Also, when the sheet carrying conveyor 11 is stopped, the lifters 31 are projected from below the sheet carrying surface of the conveyor 11 into the cutouts 27, so that the unprocessed sheets 2 overlying the sheet carrying conveyor 11 are lifted upwardly, inserted into the gaps between the hot plates 6. In this state, if the hydraulic cylinders 23 are operated to protrude the rams 24, conversely to the previous description, the press is closed, the unprocessed sheets 2 being heat pressed, thereby obtaining the processed sheets 3.

After the heat press, the rams 24 are made to retract into the cylinders 23. Thus, the hot plates 6 and the movable platen 22 are moved by the engagement between the engagement members 21 and the engagement rail 19 and that between the moving members 21 and the rail 18. The limiting members 26 provided at the four corners of the right-handed hot plate 6 engage with the associated brackets 25 provided at the four corners of the adjacent hot plate 6, and this movement is repeated step by step from right to left, resulting in the press released state in which the hot plates 6 are spaced apart at equal intervals in the direction normal to that in which the sheets 2 are transferred. At this time, the lifters 31 are temporarily moved below the level of the sheet carrying surface and then the coupling beams 32 are moved downwardly. Then, the lower ends of the heat-pressed sheets 3 are moved down onto the carrying surface of the sheet carrying conveyor 11 by inserting the pushers 13 into the gaps between the hot plates 6.

During this time, on the side of the unloader 34, the unloader racks 8 bearing no sheet are made to wait at locations in which they are in phase with the gaps between the hot plates 6 during the period in which the press is at a standby. In the meantime, the sheet unloading conveyor 10 is projected above the level of the sheet carrying surfaces of the chain conveyors 4 or the belt conveyors 5 and is waiting in a state of being flush with the level of the sheet carrying surface of the sheet carrying conveyor 11.

After the processed sheets 3 have been pushed down onto the sheet carrying conveyor 11, the sheets 3 are fed together into the gaps between the unloader racks 8 by synchronously driving the sheet carrying conveyor 11 and the sheet unloading conveyor 10. During this time, similar to the previous description, the lower ends of the processed sheets 3 are engaged with the projections 38 provided along the outer circumferences of the rolls 28 to receive the rotary forces provided by the rolls 28. Therefore, even if a camber is formed on the processed sheets 3 after heat press, such processed sheets 3 are forcibly loaded into the unloader racks 8.

After it has been detected the fact that all the processed sheets 3 have been transferred from the hot plates 6 to the unloader racks 8, the next group of the unprocessed sheets 2 are fed into the gaps between the hot plates 6 by the sheet loading conveyor 9. When the sheet unloading conveyor 10 has been stopped and moved to the lower limit, the lower ends of the processed sheets 3 are supported on the chain conveyor 4 and the belt conveyor 5. Subsequently, on the sheet-unloading side, the unloader racks 8 are laid at a location where the direction of travel of the processed sheets 3 is changed, and the processed sheets 3 are taken out.

Although, in the first preferred embodiment, the sheet loading conveyor 9 of the loader 33, the sheet carrying conveyor 11 of the horizontal multistage press, and the sheet unloading conveyor 10 of the unloader 34 include the rolls 28, some of which are provided with the projections 38 for applying forcible driving forces by engaging with the lower ends of the unprocessed sheets 2 and the processed sheets 3. However, in respect of raw lumber of unused kinds in which bending and camber tend to manifest themselves further conspicuously, the projections 38 may be provided around all the rolls 28 or the number of the roll 28 per se may be increased, thereby increasing the level of their forcible driving forces.

The horizontal multistage press constituting the first preferred embodiment is arranged in such a manner that, even when the thickness of a sheet to be processed is increased to more than an initially preset value owing to the modification of specifications, adjustment can be easily and effectively performed with respect to such variation without the need of spęcial operations for extending the gaps between the hot plates of the press.

The second preferred embodiment will be described below with reference to FIGS. 9 to 17, and the construction of this embodiment is first explained.

Hot plates 209 are provided with supply ducts 211 at their upper portions and discharge ducts 212 at their lower portions in order to supply a heating medium such as hot oil or water vapour into channels formed in the respective hot plates 209. A stopper 222 is disposed on a sheet-unloading side of conveyors 218, such the stopper 222 being connected to a screw mechanism secured to the lower lateral beams 202 by a suitable means or being connected to piston rods 221 in hydraulic cylinders 220 for free movement in the direction in which sheets are fed.

A pair of lifters 223 are disposed between the conveyors 218 so that they can be moved above and below the level of the sheet carrying surface and inserted into cutouts 217. During the period in which the press is at a standby, the lifters 223 each have length substantially equivalent to the length between the outermost hot plates 209.

A pair of slide guides 224 are provided at an equal interval in face-to-face relationship in such a manner as to extend in the vertical direction along the surface of one of frames 204. A sliding plate 225 are fitted between the slide guides 224, and a plurality of hydraulic cylinders 226 are inserted into an axial opening of the sliding plate 225 at substantially equal intervals. A pair of slide guides 227 are disposed to extend in the vertical direction on the back of a movable platen 210 in correspondence in number with rams 228 and in face-to-face relationship therewith. Sliding plates 229 are fitted between the slide guides 227, and the rams 228 are inserted into and held by the sliding plates 229.

Through-holes are formed in the aforesaid sliding plates 225 on the frame 204 in the vicinity of the opposite ends thereof, and the through-holes are internally threaded. Stepping screws 231 held by associated guide plates 230 are screwed into the upper and lower portion of the internal threads. The forward and reverse rotation of the stepping screws 231 allows the upward and downward movements of the sliding plate 225.

Figure 14:
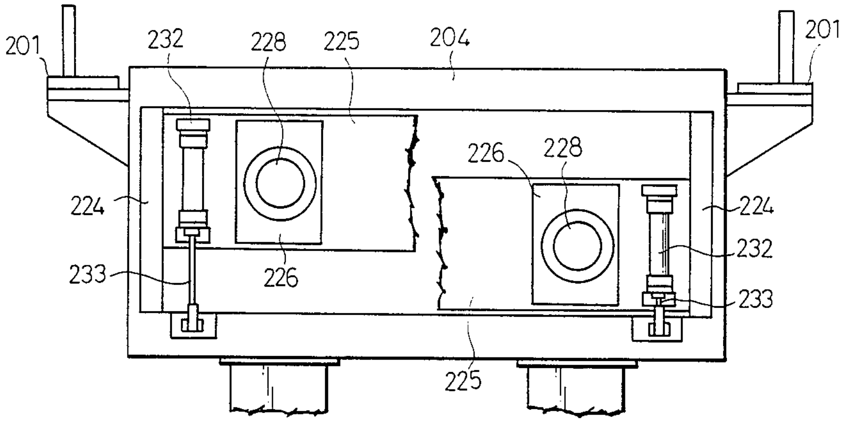
FIG. 14 is a view similar to FIG. 12, but schematically showing a modified form of the second embodiment and used with an aid to explaining the operation thereof.

It is to be noted that the sliding plates 225 can be moved upwardly and downwardly along the aforesaid right and left slide guides 224 by a rack and pinion mechanism or by means such as a hydraulic mechanism as shown in FIG. 14. Specifically, a pair of hydraulic cylinders 232 are disposed for vertical movement in the vicinity of the opposite ends of the sliding plate 225, and ends of piston rods 233 are mounted on the frame 204.

In the second preferred embodiment shown in FIGS. 9 to 14, the hot plates 209 and the movable platen 210 are suspended from a pair of rails 205 and 206 overlying on the upper lateral beams 201. However, in a modification shown in FIGS. 15 to 17 which will be described below, additional pair of rails 205 and 206 are laid on lower lateral beams 202, at least one pair of the upper and lower rail pairs are supported for vertical movement along sliding surfaces 234 formed on the upper lateral beams 201 or the lower lateral beams 202, and the hot plates 209 and the movable platen 210 being resiliently supported by moving members 208 and engagement members 207 which are resiliently laid on the rails 205 and 206. The rails 205 are laid on the upper and lower lateral beams 201, 202 and the engagement rails 206 are laid on the other upper and lower lateral beams 201, 202. The moving members 208 are disposed on the aforesaid rails 205 and the engagement members 207 are disposed on the aforesaid engagement rails 206.

The hydraulic cylinders 226 are disposed on the right frame 204 and a left frame 203, and rams 218 are disposed on the movable platens 210 in the same manner as the above-described embodiment and thus the hot plates 209 can be moved between the opposite sides and the center.

The aforesaid upper and lower rails 205 and 206 are urged against each other by a predetermined level of pressure. In the example shown in FIGS. 16 and 17, the lower rails 205 and 206 are slidable along a guide surfaces 234 of the lower lateral beams 202 and spring members 235 are fitted between the upper surfaces of the lower lateral beams 202 and the lower surfaces of the lower rails 205, 206. Thus, in a normal state, the lower rails 205 and 206 are pushed up at a predetermined pressure.

The operation of the second embodiment will be described below.

Figure 15:
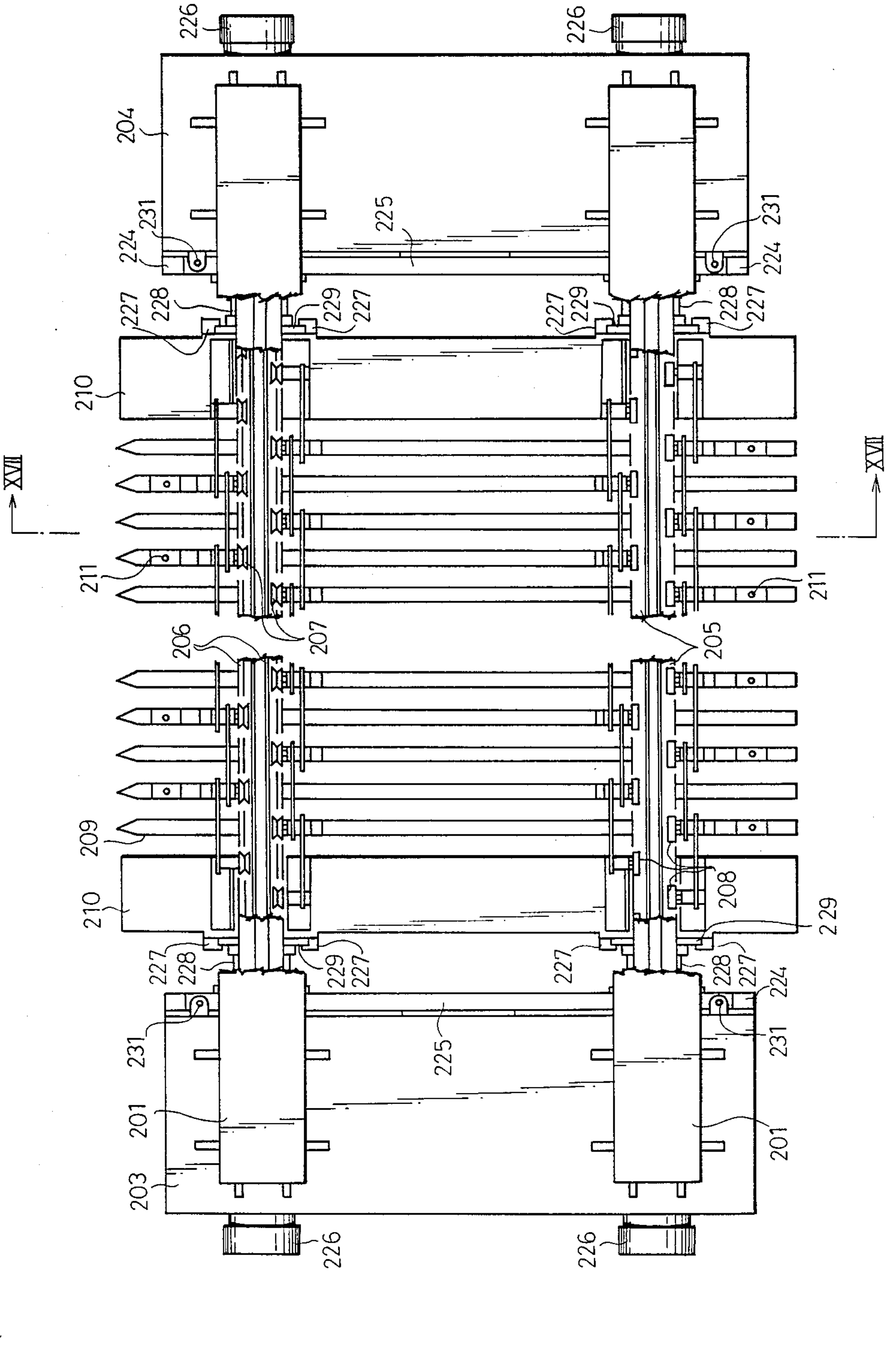
FIG. 15 is a plan view schematically showing an example of a horizontal multistage press constituting the second preferred embodiment of the present invention.

When the hydraulic cylinders 226 are operated to retract the associated rams 228, the movable platens 210 and the respective hot plates 209 are moved to the right as viewed in FIG. 15 between the opposing upper lateral beams 201 with the members 210 and 209 being parallel to each other on one side thereof, along the rails 205, 206 by the engagement between the engagement rails 206 and the engagement members 207 and between the moving members 208 and the engagement members 207. In consequence, the press assume a standby state.

Figure 16:
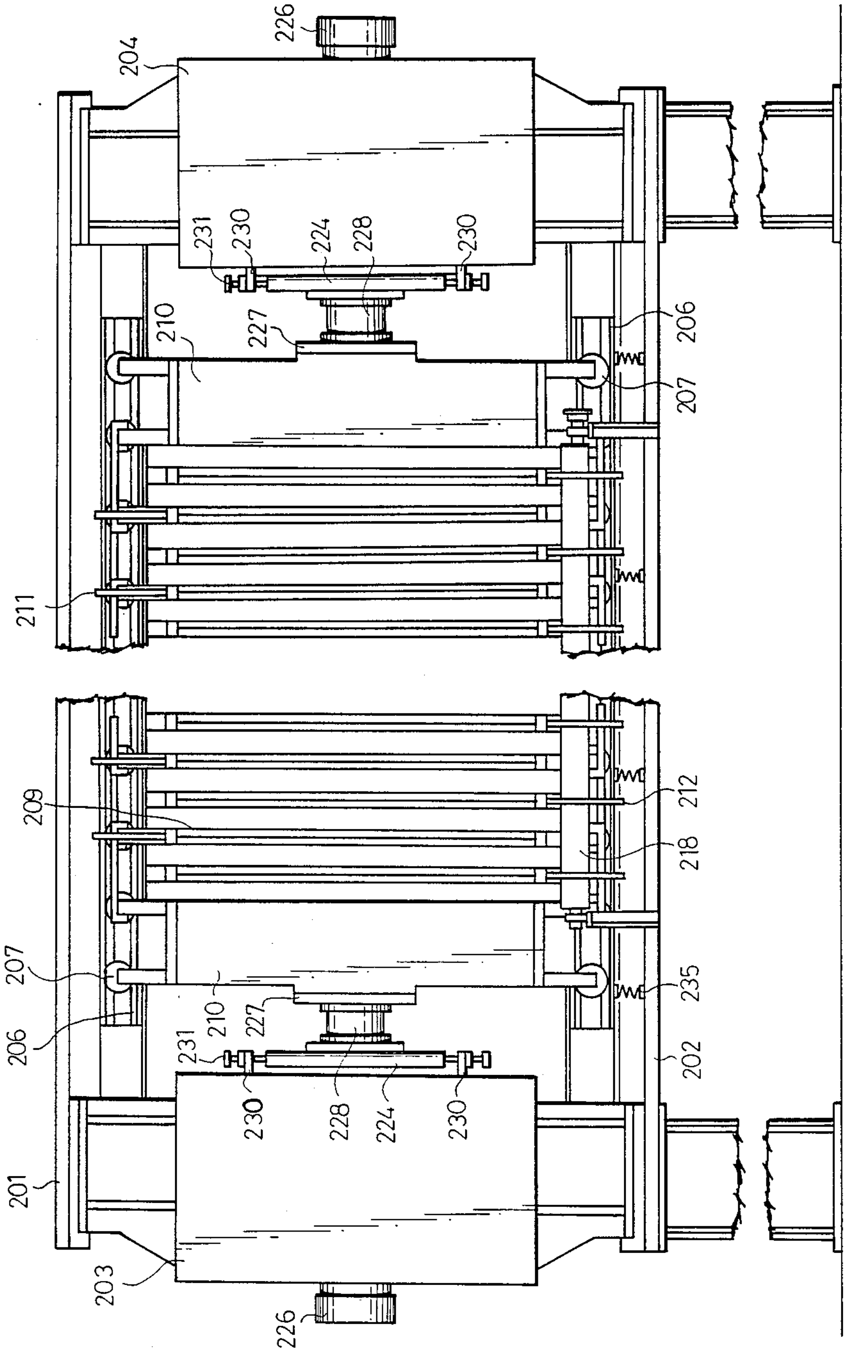
FIG. 16 is a side elevational view of the horizontal multistage press shown in FIG. 15.
Figure 17:
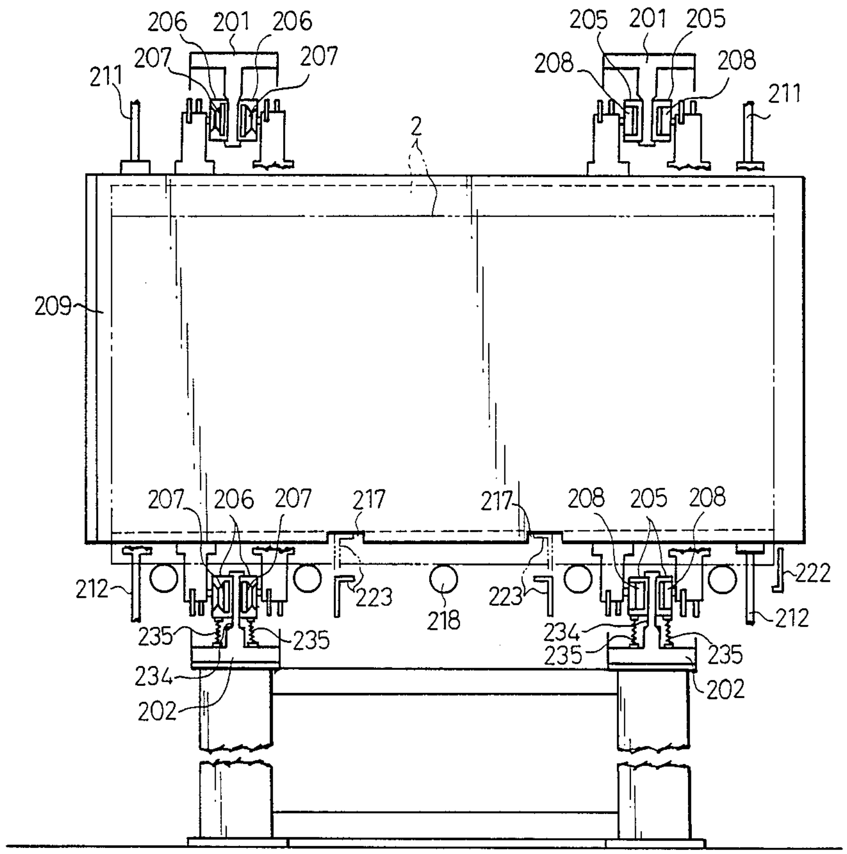
FIG. 17 is a view taken along line XVII—XVII of FIG. 15.

At this time, in the examples shown in FIGS. 15 to 17, the movable platens 210 and the respective hot plates 209 are moved resiliently on the upper and lower rails 205 and 206 by the moving members 208 and the engagement members 207 in the right and left directions as viewed, for example, in FIGS. 15, so that the press is brought into the standby state.

Subsequently, the heat medium is supplied into the hot plates 209 so as to maintain them at a predetermined temperature, and the unprocessed sheets 2 are loaded together from the loader located on the sheet-loading side.

If the pushers 223 are protruded into the cutouts 217 from below the sheet carrying surface, the unprocessed sheets 2 overlying on the conveyor 210 are lifted upwardly and inserted into the gaps between the hot plates 209 for heat-press purposes. During this time, the stopper 222 and the lifters 223 are retracted below the sheet carrying surface of the conveyor 218. After the heat-press, the processed sheets 3 are transferred to the unloader.

However, each time the next group of the unprocessed sheets 2 differ in size, the hydraulic cylinders 226 and the rams 228 are vertically moved in the following order while the stopper 222 is being moved back and forth in the direction of travel of the sheets.

In cases where the sizes of the unprocessed sheets 2 are vertically reduced, the position of the stopper 222 is fixed, and the stepping screws 231 are moved in a screwed manner or the hydraulic cylinders 232 for vertical movement are operated. Thus, the vertical positions of the hydraulic cylinders 226 are adjusted by sliding the sliding plates 225 along the slide guides 224. In synchronism with this operation, the sliding plates 229 slide along the slide guides 227, so that the positions of the rams 228 are adjusted to thereby position the pressure point at substantially the vertical centers of the unprocessed sheets 2.

Figure 12:
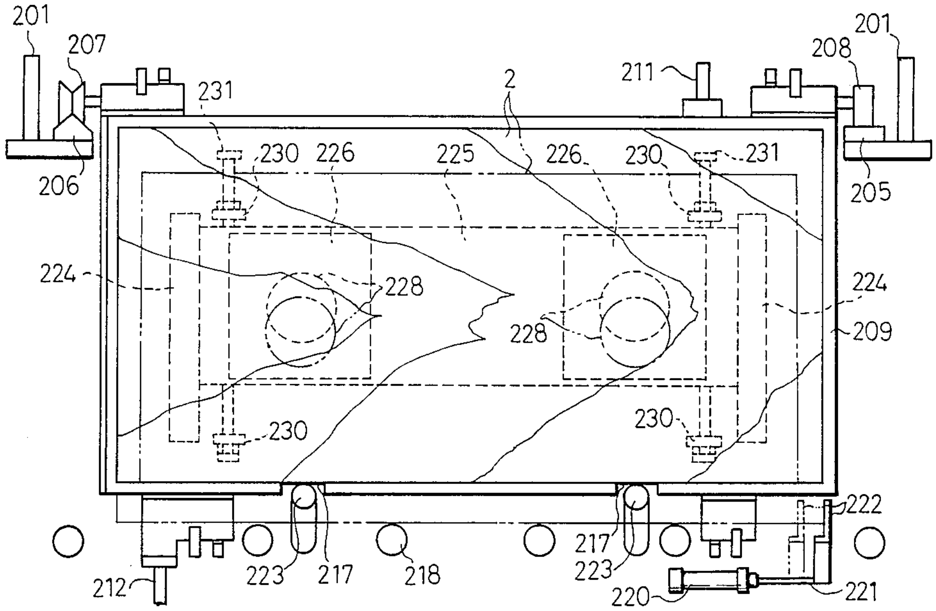
FIG. 12 is a view taken along line XII—XII of FIG. 9.
Figure 11:
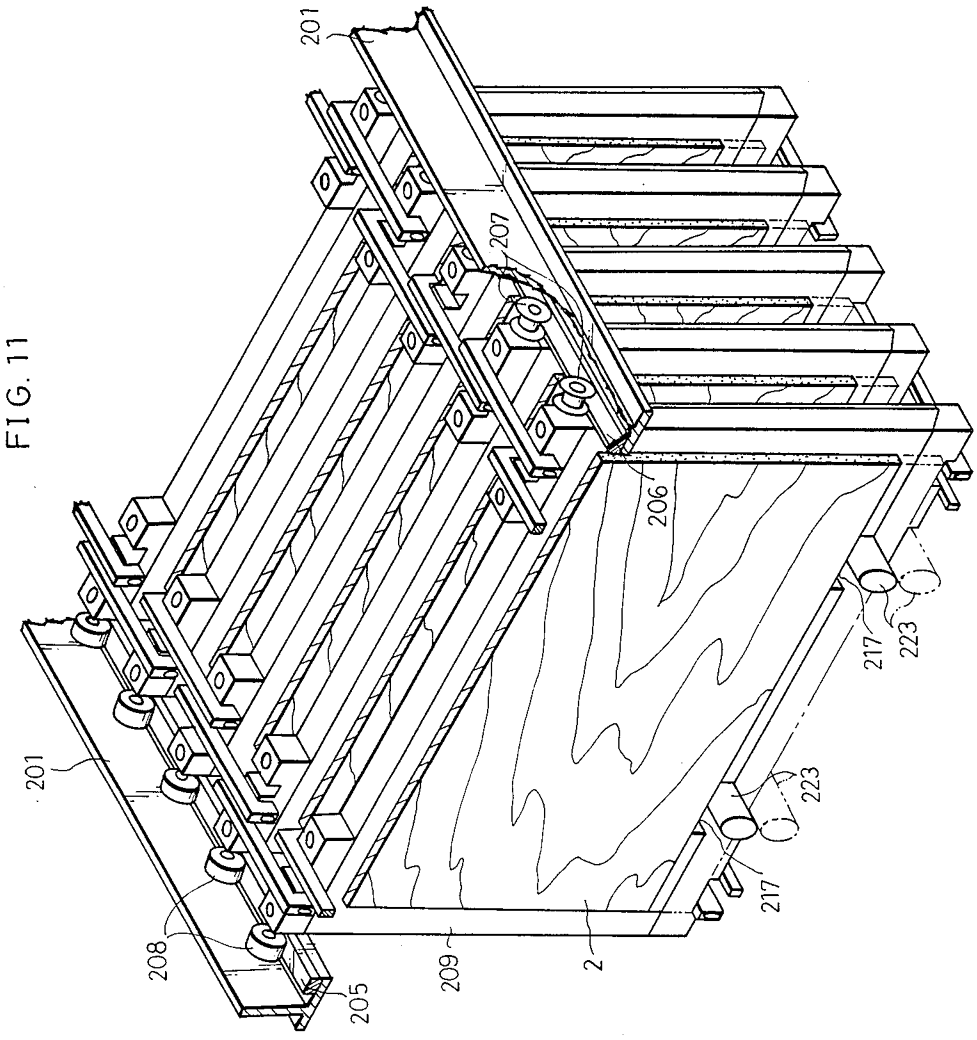
FIG. 11 is a perspective view schematically showing the essential portion of the second embodiment.
Figure 13:
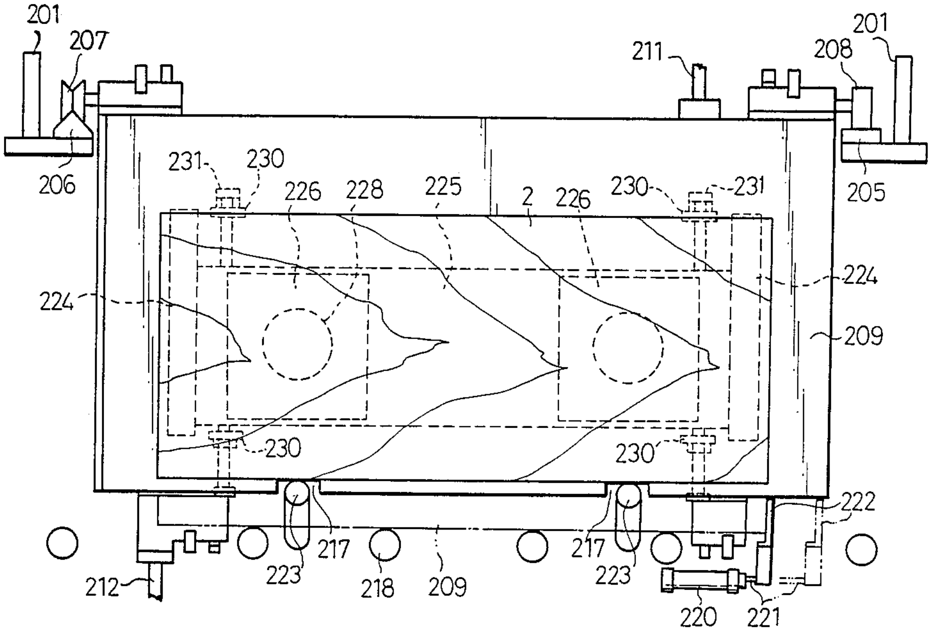
FIG. 13 is a schematic view of the second embodiment.

In cases where the lengths and the widths of the respective unprocessed sheets 2 are reduced step by step from the position indicated by a solid line in FIG. 12 to the position indicated by a solid line in FIG. 13, the positioning hydraulic cylinder 220 is operated in linked relationship with the vertical movement of the left and right frames 203 and 204 and the slide members 225 and 229 of the movable platen 210, thereby moving the stopper 222 in the direction of travel of sheets.

Specifically, the piston rod 221 is retracted into the hydraulic cylinder 220 by half a distance equivalent to the reduced lateral sizes of the respective unprocessed sheets 2, so as to make coincide the centers of the unprocessed sheets 2 in the direction of travel of the sheets with the centers of the respective hot plates 209 between the sheet loading and unloading ends thereof. This provides adjustment of the pressure points in the lateral directions of the unprocessed sheets 2.

It should be noted that, if the vertical movement provided by the stepping screws 231 and the limit position of the forward and backward movement provided by the positioning hydraulic cylinders 220 are in advance determined by a detector and a counter in accordance with the lengths and widths of the unprocessed sheets 2 which are loaded into the gaps between the hot plates 209, it is possible to further smoothly adjust the aforesaid pressure points.

As described above, in the second preferred embodiment, the pressure points are consistently maintained at the substantial centers of the unprocessed sheets, and this ensures the application of a well-balanced pressure.

It is thus possible to eliminate drawbacks such as the occurrence of reduction in the thicknesses of the processed sheets attributed to the shift of the pressure points and exfoliation produced generally at the four edge portions thereof, and a single horizontal multistage press can be used to heat-press the unprocessed sheets in accordance with the modification of the sizes.

With reference to FIGS. 18 to 27, the third preferred embodiment of the present invention will be described below in comparison with the first preferred embodiment.

The third preferred embodiment is characterized by the frames 16, 17 and the movable platen 22 having the following structure.

Figure 19:
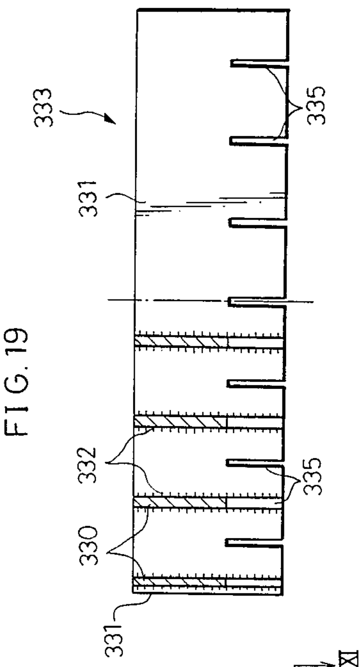
FIG. 19 is a perspective view taken along line XIX—XIX of FIG. 18.
Figure 18:
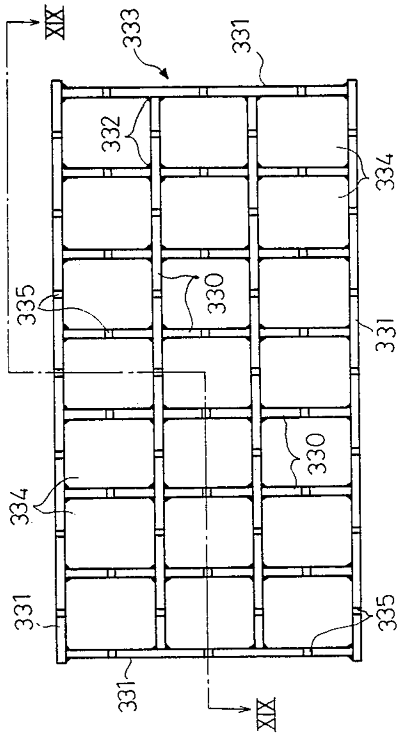
FIG. 18 is a plan view schematically showing a first constructional example of a third preferred embodiment of the present invention.

Referring to FIGS. 18 and 19 showing a first constructional example, a lattice-like structure 333 is opened at its opposite sides in the direction of application of pressure by a multistage press, i.e., parallel to the length of the same. Rib plates 330 and side plates 331 constitute each lattice portion 334 of the lattice-like structure 333, and grooves 335 each having a predetermined length are cut in the rib plates 330 and side plates 331 so as to extend inwardly of the sides thereof in contact with the hot plates 6.

Figure 21:
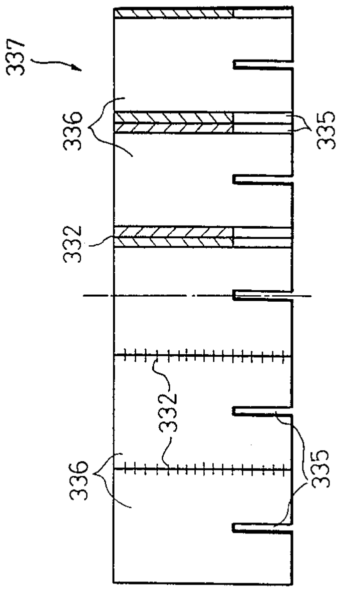
FIG. 21 is a view taken along line XXI—XXI of FIG. 20.
Figure 20:
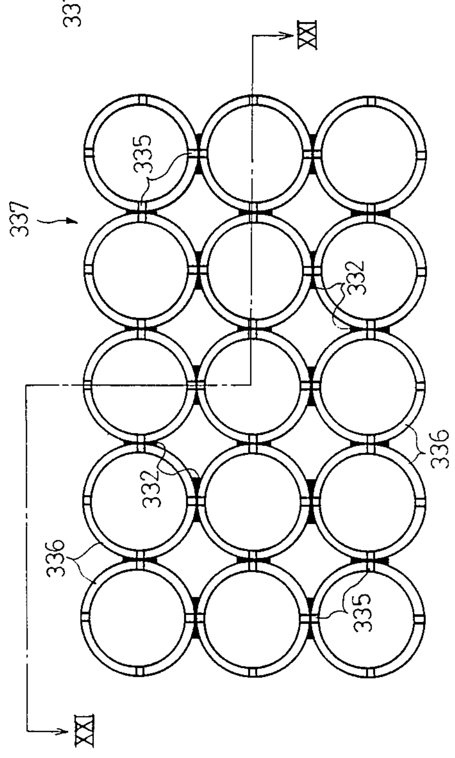
FIG. 20 is a plan view schematically showing a second constructional example of the third preferred embodiment of the present invention.

Referring to FIGS. 20 and 21 showing a second constructional example, a plurality of steel pipes 336 having opposite open ends and the same diameters and lengths are disposed parallel to the direction of pressure applied by the multistage press. All the contacts between the adjacent pipes 336 are united by welded portions 332 to form a steel pipe structure 337.

The steel pipe structure 337 is normally constructed in a substantially rectangular cross sectional shape in accordance with the size of each sheet to be processed. The grooves 335 each having a predetermined length are cut in the respective pipes 336 so as to extend inwardly of the sides thereof in contact with the aforesaid hot plates 6.

In addition, referring to FIGS. 22 to 25 showing other examples of the aforesaid second constructional examples of the steel pipe structure 337, side plates are disposed around the steel pipes 336 constituting the outer periphery of the structure 337.

Figure 22:
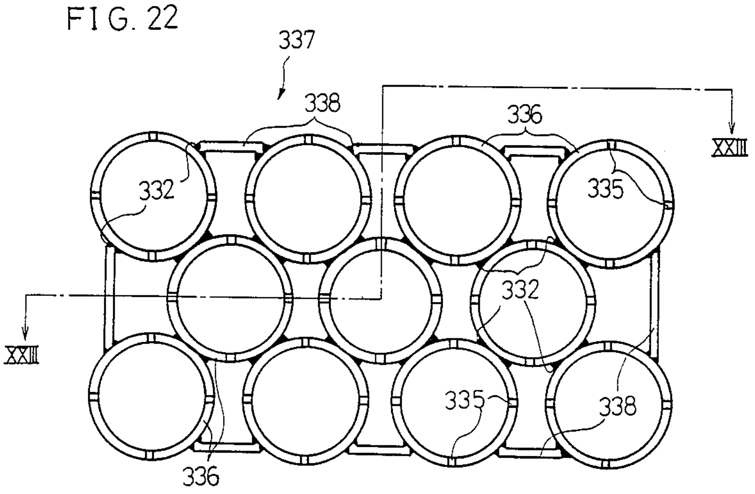
FIG. 22 is a plan view schematically showing a third constructional example of the third preferred embodiment of the present invention.
Figure 23:
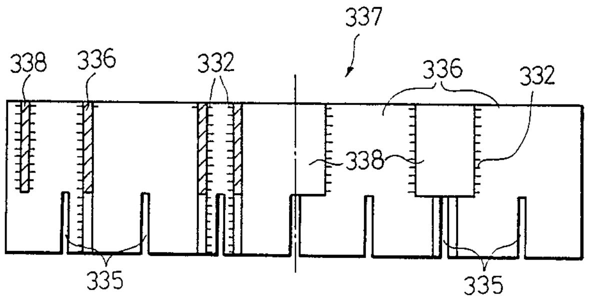
FIG. 23 is a view taken along line XXIII—XXIII of FIG. 22.

Referring to FIGS. 22 and 23 showing a third constructional example, the aforesaid steel pipe structure 337 includes the steel pipes 336 which abut against one another, the phases thereof being shifted relative to one another. As compared with the aforesaid second constructional example, the outside steel pipes 336 have the welded portions 332 less in number than the inside steel pipes 336. Thus, in order to reinforce and connect the steel pipes 336, side plates 338 of a long strip shape are disposed in the respective gaps between the outermost steel pipes 336, such side plates 338 extending from the side of the structure 337 which does not contact the aforesaid hot plates 6 to the inner ends of the grooves 335 of the steel pipes 336. These members are connected by the welded portions 332.

The side plates 338 used in the third constructional example are of a long strip shape, and are disposed between the outermost steel pipes 336. In a fourth constructional example shown in FIGS. 24 and 25, an elongated side plate 339 having the same length as that of the steel pipes 336 is disposed to cover all the outermost steel pipes 336. The contacts among the adjacent steel pipes 336 and the side plate 339 are connected to one another by the welded portions 332, and in addition, the grooves 335 having given lengths are cut in the steel pipes 336 and the side plates 339 so as to extend inwardly from the side thereof adjacent to the aforesaid hot plates 6. With this arrangement, since there is an increase in the contact area relative to the hot plates 6, it is possible to reduce strain involved with the bending stress of the hot plates.

It should be noted that, concretely speaking, the left side of the right frame 17 and the right sides of the movable platen 22 and the left frame 16 are in contact with the hot plates 6. In the case of a dual movable platen type in which the hydraulic cylinders 23 are also provided in the right frame 17, the left side of the left-handed movable platen comes into contact with the hot plates 6.

However, since the left-handed frame 17, the left and right frames 16 and 17 of a movable platen type are disposed separately from the hot plates 6, they can avoid, to some extent, thermal expansion as might be caused by heat actions, so that the cutouts 335 may not be formed.

Incidentally, in order to construct the steel pipe structure 337, the steel pipes 336 having the same or different diameter may be disposed adjacent one another, or the steel pipes 336 may be disposed in or out of phase with one another.

Figure 25:
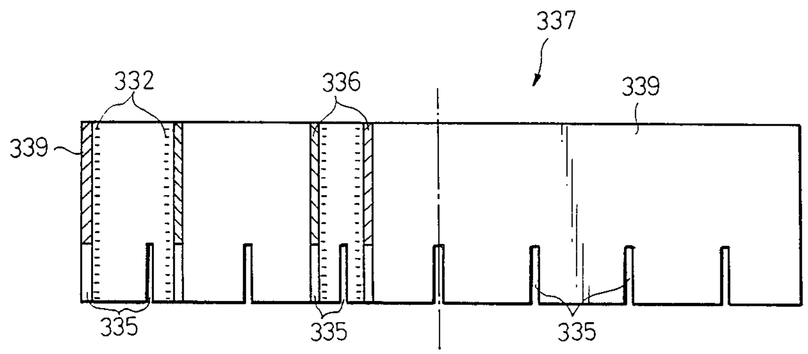
FIG. 25 is a view taken along line XXV—XXV of FIG. 24.
Figure 24:
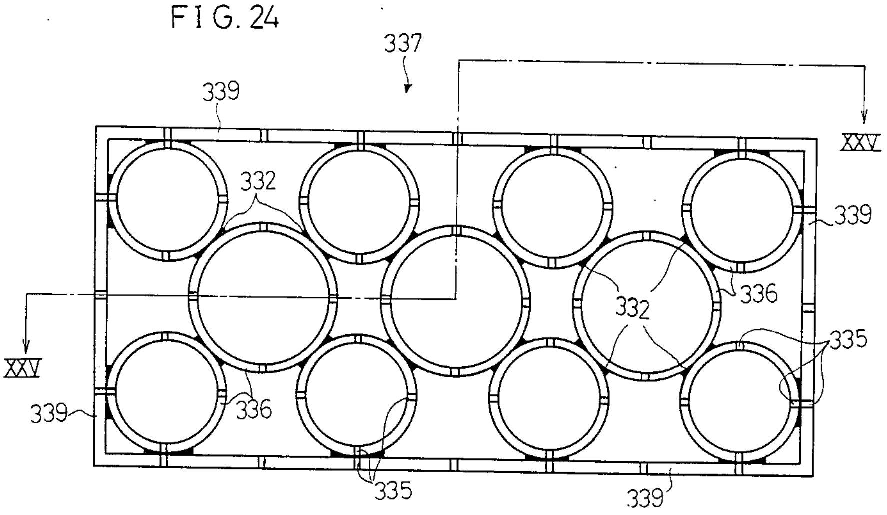
FIG. 24 is a plan view schematically showing a fourth constructional example of the third preferred embodiment of the present invention.

In addition, similar to the long size side plates 339 shown in FIGS. 24 and 25, the side plates 338 of a long strip shape shown in FIGS. 22 and 23 are made equal in length to the steel pipes 336. Conversely, like the side plates 338, the long size side plates 339 may also be made shorter in length than the steel pipe 336. In the former case where the plates 338 of a long strip shape are made equal in length to the steel pipes 336, grooves similar to the grooves 335 formed in the steel pipes 336 are preferably cut in the side plates 338 of a long strip shape.

Accordingly, in the third preferred embodiment, when the unprocessed sheets 2 are heat-pressed during the closed state of the press, the respective members in direct contact with the hot plates 6 are heated under the influence of the temperature of the hot plates 6. However, since the respective members have opposite open ends in the direction of application of pressure, air insulation from heat can first be obtained.

Also, the respective members in contact with the hot plates 6, i.e., the rib plates 330, the side plates 331 and the steel pipes 336 which constitute the respective lattices 334 forming the members as well as the steel pipes 336 and the side plates 338 and 339 are provided with the groove 335 in their ranges affected by thermal expansion which might be caused by heat transmission. Thus, the thermal expansion produced in the aforesaid area is absorbed by the portions of the grooves 335. Accordingly, even if a temperature difference occurs at the opposite open ends of the respective members, it is possible to eliminate stress as might be caused by strain.

In consequence, since the parallelism of the members is substantially maintained during the application of heat, it is possible to prevent the occurrence of drawbacks such as troubles involved with the opening and closing of the hot plates 6 and variation in the thicknesses of the hot plates 9 after the heat-pressing process.

In addition, as shown by the second and third constructional examples, if the respective members are constituted by the steel pipe structure 337, the number of parts used and the welded portions 337 are reduced, and other incidental effects can be enjoyed, such as reduction in time required by manufacturing.

The fourth preferred embodiment of the present invention will be described below with reference to FIGS. 26A to 31. As shown, a loader 427 is disposed on the side on which the unprocessed sheets 2 are loaded and an unloader 428 is disposed on the other side on which the processed sheets 3 are unloaded, both of them being separable from each other in the direction in which sheets are loaded and unloaded.

Next, the construction will be described.

Stoppers 429 are disposed on the loading and unloading sides of the press at the locations which are separate by a given distance from the positions closest to the press. A pair of rails 430 extends from the closest positions to the opposite stoppers 429, and frames 432 overlies on the respective pairs of the rails 430 by means of wheels 431, which are provided at the four corners of the frames 432.

Dual rod type hydraulic cylinders 433 are disposed in the substantial centers of the lower portions of the frames 432 so as to move the frames 432 toward and away from the press. Rods 434 of the same cylinders 433 are mounted at their ends on the associated frames, so that the frames 432 are movable on the corresponding rails 430. Limiting hydraulic cylinders 435 are disposed on the other sides of the rails 430 opposite to the stoppers 429. The positions of frames 432 are limited in the range as between normal and cooperative positions which will be described later in accordance with the stroke of the protrusion and retraction of rods 436 of the cylinders 435.

In the fourth embodiment, although hydraulic means are used as a matter of convenience in order to move the frames 432, another pair of stoppers may be provided on the other side of the rails 430, and the positions at which these stoppers are provided may be set to the aforesaid cooperative positions. The separate position and the cooperative position of the frames 432 relative to the press may be movably established between both stoppers by means of a chain-drive operation provided by a motor or a rack and pinion mechanism. Alternatively, the normal position may be limited by means of the chain or the engagement of the rack.

A pair of shafts 437 are mounted on the frames 432 in the longitudinal direction at a predetermined interval, such shafts 437 extending in the widthwise direction of the frames 432. Chain wheels 438 are fitted onto the opposite ends of the shafts 437, and pulleys 439 are fitted into the chain wheels 438. Chains 440 are passed between the associated chain wheels 438 and belts 441 are passed between the associated pulleys 439, thereby forming endless tracks in which the upper carrying surfaces of the belts 441 are held at a position slightly higher than the upper carrying surfaces of the chains 440. Attachments 442 constitute a part of the aforesaid pair of chains 440, and frame members 443 are secured perpendicular to the upper portions of the attachments 442. The respective pairs of the frame members 443 are connected by intermediate members 444, such that cross at right angles the direction of rotation of the chains 440, to form loader racks 445 or unloader racks 446.

The respective loader racks 445 have voids 449 at their rear ends adjacent to the hot plates 6 so as to receive the insertion guides of the hot plates 6, and the respective unloader racks 46 have guide surfaces 449 at their front ends adjacent to the hot plates 6, so as to fit into voids 448 formed in the rear ends of the aforesaid hot plates 6.

Limiting members such as spacers or rollers are attached to the upper free end portions of the loader racks 445 and/or the unloader racks 446, that is, positions at which none of the loading, supporting and unloading of the processed sheets 2 and the unprocessed sheets 3 is prevented. In the fourth embodiment, spacers 450 such as resilient members made of rubber and having the same thickness as the hot plates 6 are attached to the upper ends of the respective frame members 443 constituting the loader racks 445 and/or the unloader racks 446, so as to reduce the impact between the adjacent members.

Therefore, the loader racks 445 or the unloader racks 446 are supported in such a manner that they can freely stand or lie by virtue of the rotation of the chains 440 perpendicular to the direction in which the sheets are loaded and unloaded. On the side of the loader 427, the unprocessed sheets 2 on a lifting platform 451 is transferred to the gaps between the loader racks 445 by a sheet inserting conveyor 452 whereas, on the side of the unloader 428, the processed sheets are taken out of the gaps between the unloader racks 446, transferred onto a lifting platform 454 by a conveyor 453.

A sheet loading conveyor 455 is disposed on one of the frames 432 so as to load the unprocessed sheets 2 and on the other is disposed a sheet unloading conveyor 456 for unloading the processed sheets 3. The upper carrying surfaces of them are adapted to move above and below the level of the upper carrying surfaces of the belts 441 by means of a hydraulic operation. The aforesaid conveyors 455 and 456 are limited so as to ascend up to the same level as the upper carrying surface of the aforesaid sheet carrying conveyor 419.

In the fourth preferred embodiment, although the loader racks 445 or the unloader racks 446 are driven by the chains 440 constituting endless tracks in such a manner as to be capable of standing and lying, it is also possible to incorporate a mechanism by which the lower ends of both racks 445 and 446 are supported on the frames disposed parallel to the press.

The operation of the fourth embodiment will be described below.

For starting, the frame moving cylinders 433 are operated to move the respective frames 432 toward the press. Meanwhile, the high-pressure hydraulic limiting cylinders 435 are operated at higher hydraulic pressure than that of the aforesaid cylinders 423, thereby making their rods 436 protrude. Thus, the frames 432 are stopped at the normal positions indicated by two-dot chain lines in FIGS. 26A and 26B or shown in FIG. 29.

Then, during the period in which the press is closed, while the previously loaded unprocessed sheets 2 are being heat-pressed, the loader 427 loads each sheet of the sheets 2 to be next processed from the lifting platform 451 into the gaps between the loader racks 445 by means of the rotation of the chains 440 and the belts 441, and the respective loader racks 445 are sequentially made to stand with their lower ends being supported by the belts 441 until the loader racks 445 are filled with the sheets 2.

Meanwhile, the unloader 428 piles the processed sheets 3 which have previously been loaded on the lifting platform 454 from of the conveyor 453 with their lower ends being supported by the belts 441, and thus the processed sheets 3 are unloaded from the gaps between the unloader racks 446.

After completion of heat-pressing, the press is opened and at the same time the respective gaps between the loader racks 445, the hot plates 6, the unloader racks 46 are made to equal one another. At this time, if the limiting hydraulic cylinders 435 are operated to retract their rods 436, the frames 432 are released from the stopped states, and they are allowed to approach from their normal positions the horizontal multistage press 426 by the strokes of the rods 436, reaching the cooperative positions by the cylinders 433.

Figure 26A:
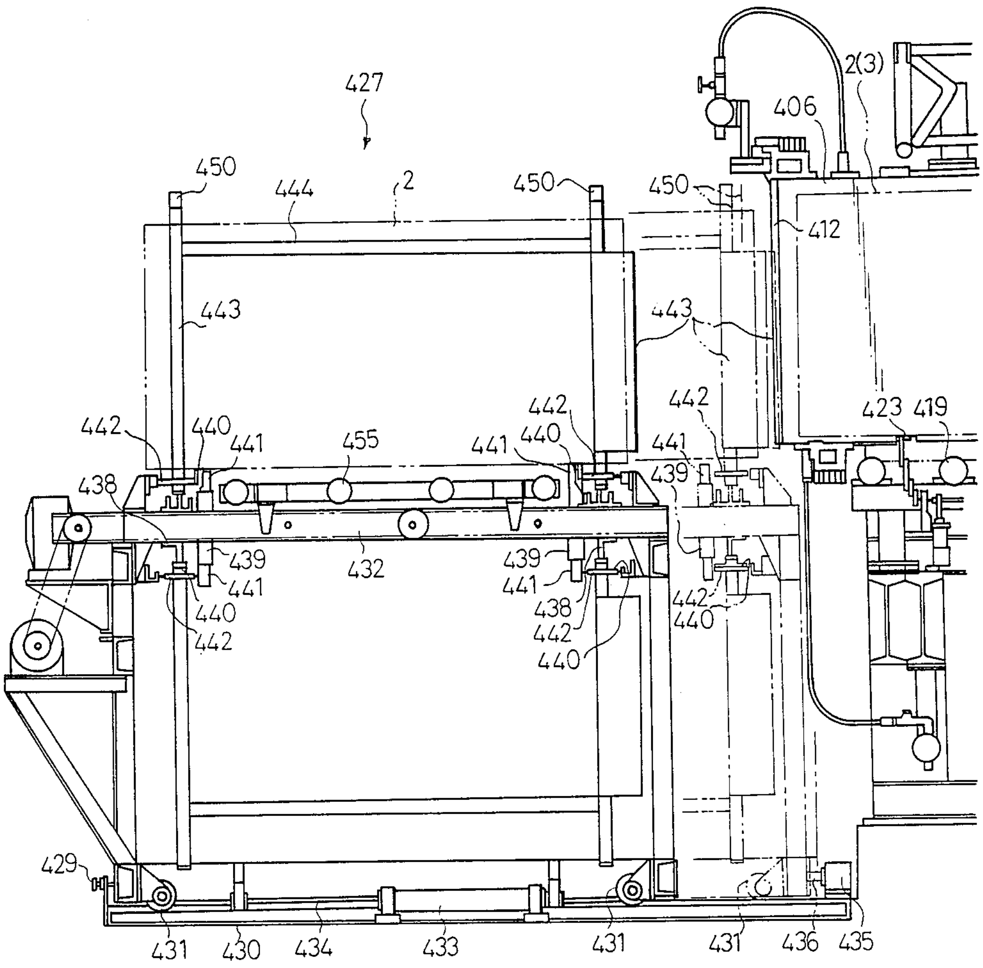
FIGS. 26A and 26B are respectively front elevational views schematically showing a fourth preferred embodiment of the present invention.
Figure 26B:
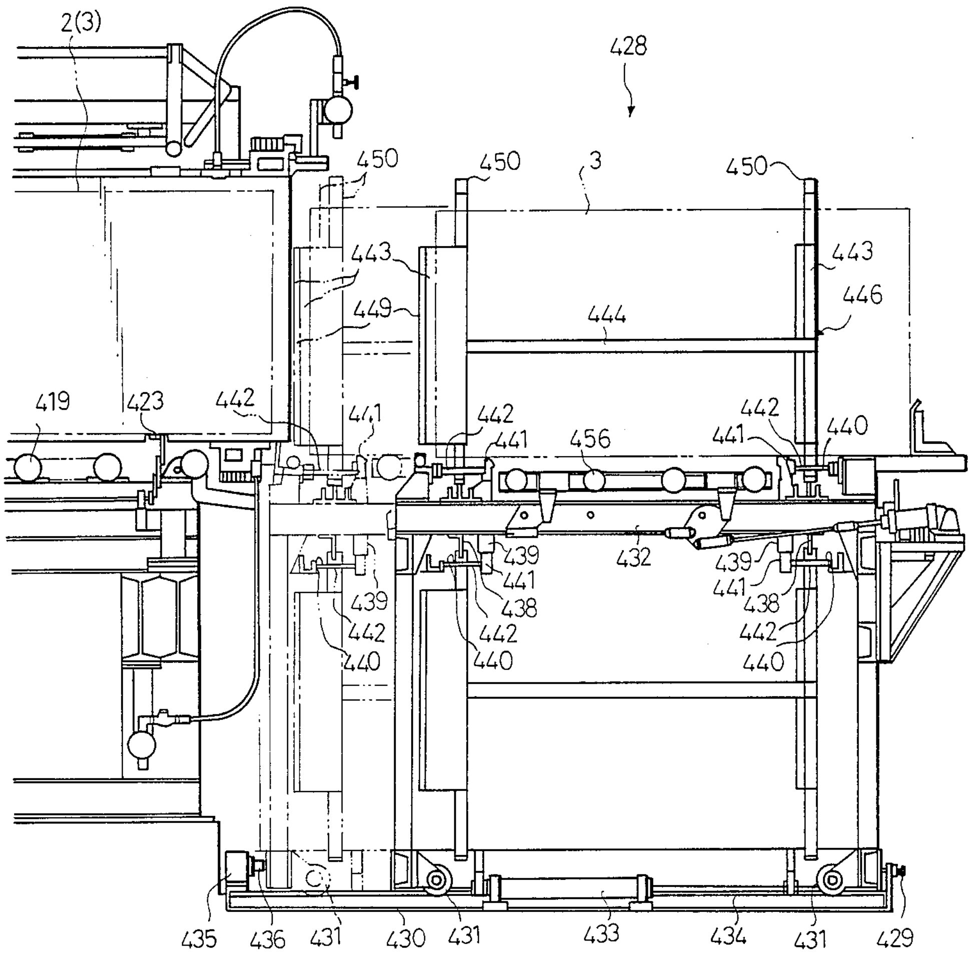
Figure 27:
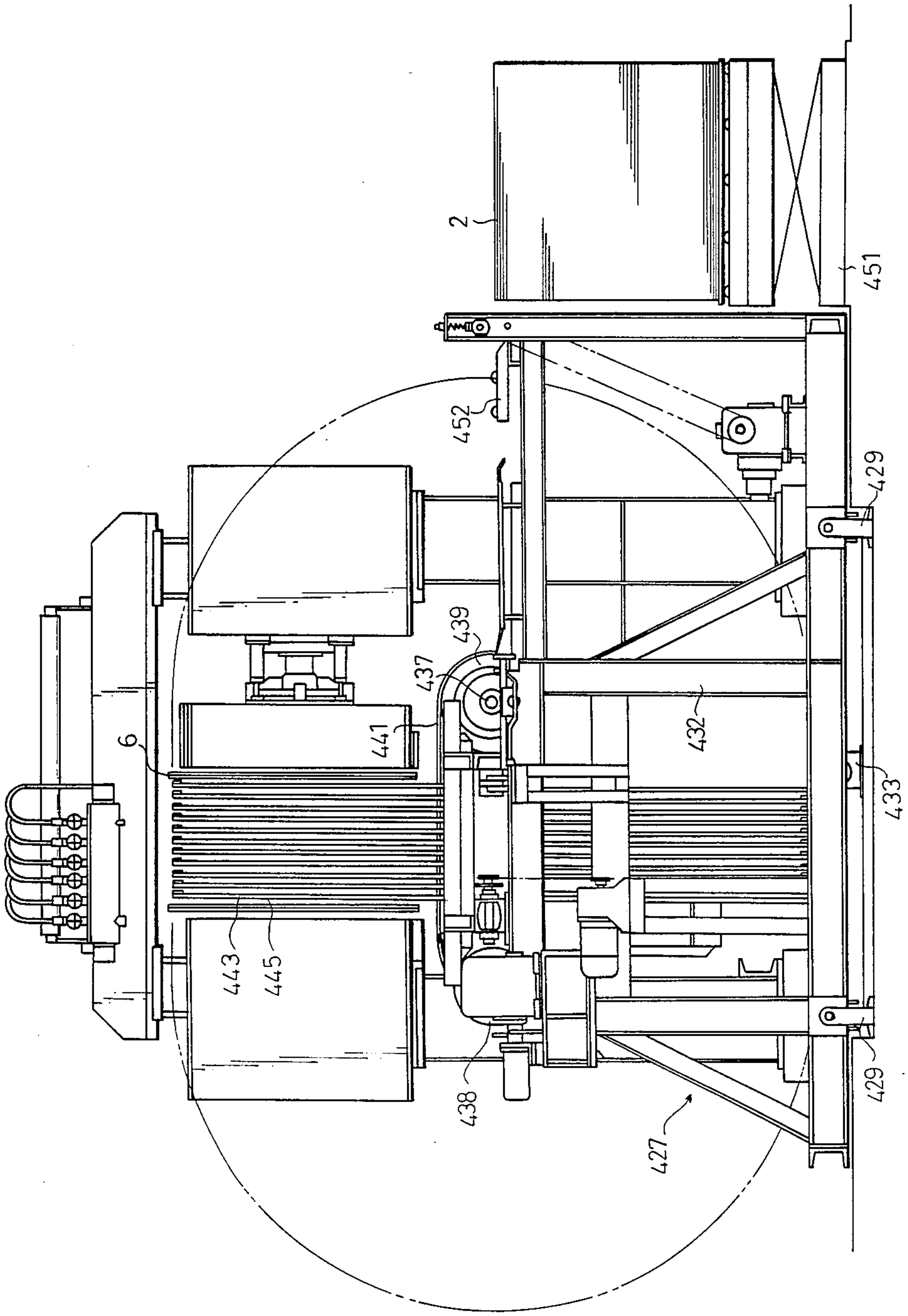
FIG. 27 is a left side elevational view schematically showing the fourth embodiment shown in FIGS. 26A and 26B.
Figure 28:
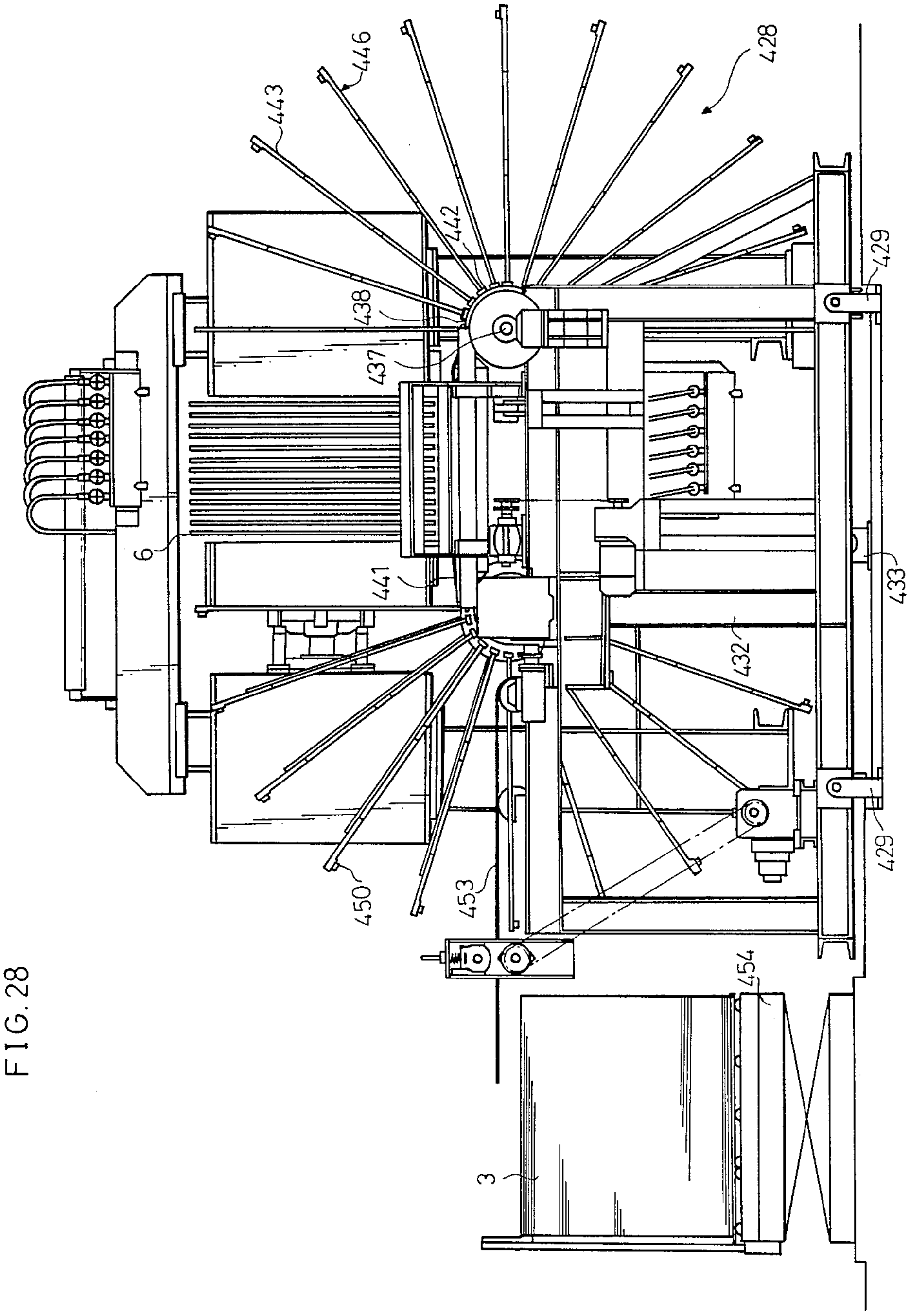
FIG. 28 is a right side elevational view schematically showing the fourth embodiment shown in FIGS. 26A and 26B.
Figure 29:
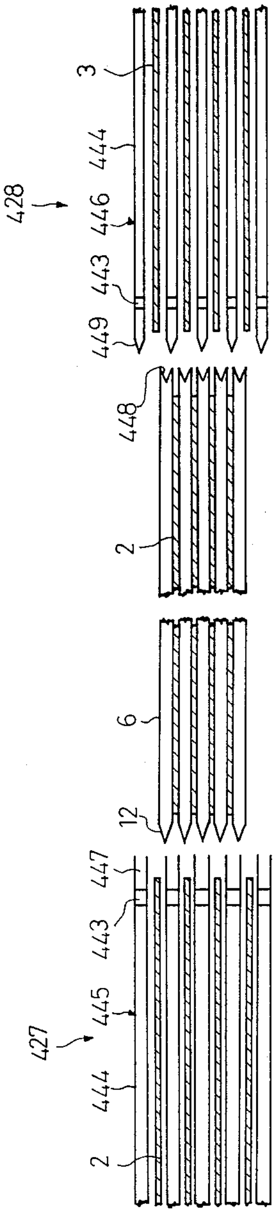
FIGS. 29 to 31 are respectively used as an aid to explain the operation of the fourth embodiment.
Figure 30:
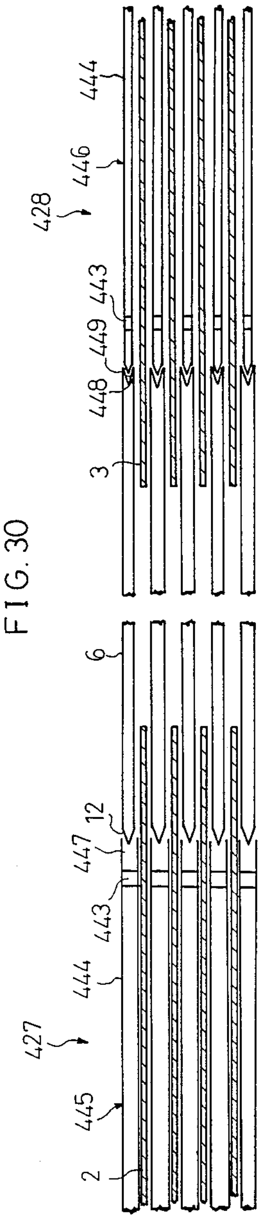

Specifically, the respective frames 432 are moved from the positions indicated by the two-dot chain lines to the positions indicated by the one-dot chainlines in FIGS. 26A and 26B, or further approaches the press along the rails 430 as shown in FIGS. 29 and 30. Thus, the cooperative state is provided in which the voids 447 of the loader racks 445 engages with the insertion guides 12 of the hot plates 6 and the voids 448 of the hot plates 6 engages with the guide surfaces 449 of the unloader racks 446.

In this state, lifters 423 are made to descend and thus transfer the processed sheets 3 to the carrying conveyor 419. Simultaneously, a sheet loading conveyor 455 and a sheet unloading conveyor 456 protrude above the upper surface of the belts 441, and the sheet carrying surfaces of the three conveyors 419, 455 and 456 are made flush with one another. The respective conveyors 419, 455 and 456 are driven to positively transfer the processed sheets 3 from between the hot plates 6 to between the unloader racks 446 and the unprocessed sheets 2 from between the loader racks 445 to between the hot plates 6.

Subsequently, when the limiting hydraulic cylinders 435 are again operated, the rods 436 are protruded against the pressure provided by the frame moving cylinders 433, and the cooperative state are thereby released and the respective frames 432 are restored to the normal positions. Subsequently, the unprocessed sheets 2 are heat pressed and the loader 427 and the unloader 428 wait for the following operations described previously.

Figure 31:
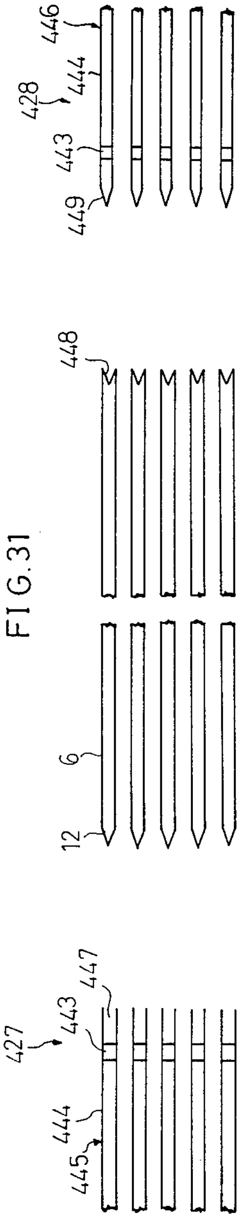
Figure 32:
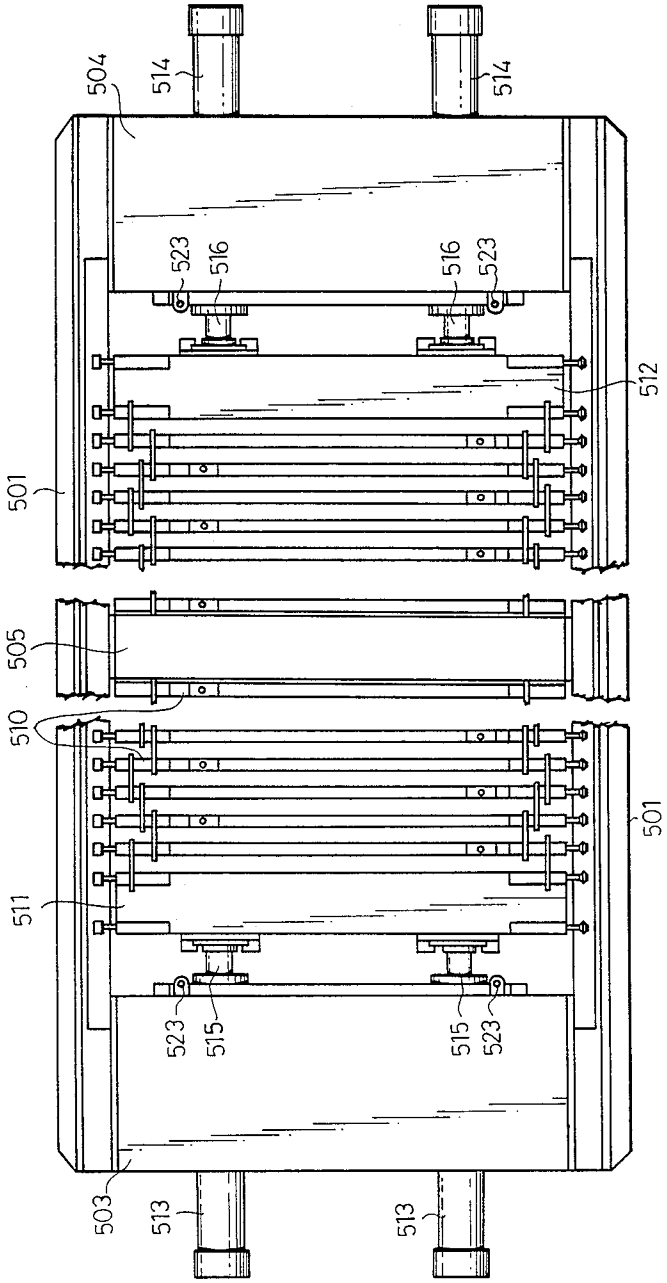
FIG. 32 is a partially cutaway, plan view schematically showing a fifth preferred embodiment of the present invention.
Figure 33:
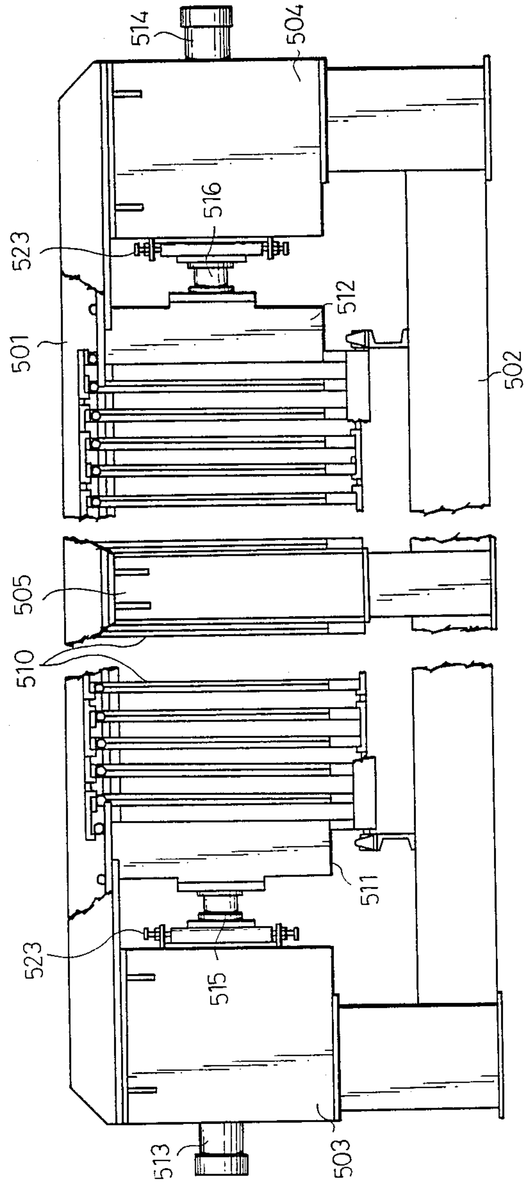
FIG. 33 is a side elevational view of the fifth embodiment shown in FIG. 32.

While the operation is being performed or after completion of the operation, if it is necessary to remove pieces of lumber and dust which have been accumulated under the loader 427, the horizontal multistage press, and the unloader 428, if any trouble occurs in the respective components, or furthermore if periodical maintenance and inspection are to be carried out, the frame moving cylinders 433 are operated and the respective frames 432 are moved from the normal position to the separate position. Specifically, the frames 432 are respectively moved from the positions indicated by the two-dot chain lines in FIGS. 26A and 26B to the positions indicated by solid lines in the same Figures. Alternatively, as shown in FIGS. 29 to 31, the frames 432 are separated from the horizontal multistage press to expand the respective spacings therebetween, and this enables the easy performance of various operations.

A fifth preferred embodiment of the present invention will be described below with reference to FIGS. 32 to 37.

In the fifth embodiment particularly shown in FIGS. 32, 33, 36 and 37, a central frame 505 is disposed upright generally at the center of the upper and lower lateral beams 501 and 502, so as to prevent deflection of upper and lower lateral beams 501 and 502. Also, the same components as hot plates 510 are fixed on both sides of the aforesaid central frame 505.

When the press constituting the fifth embodiment needs to simultaneously or separately heat-press a plurality of kinds of the unprocessed sheets 2 each having a different size between the hot plates 510 as on both sides of the central frame 505, hydraulic cylinder 513, 514 and rams 515, 516 are disposed for movably in perpendicular planes of left and right frames 503, 504 and left, right movable platens 511, 512.

The operation of the press constructed as described above will be described below.

While the hot plates 510 and movable platens 511 are being moved, the hot plates 510 located on both sides of the central frame 505 are spaced apart at equal intervals, in the order starting with the hot plates 510 adjacent to the outermost hot plates 510 fixed on the opposite outermost sides of the central frame 505, so that the press is at a standby.

Subsequently, the unprocessed sheets 2 are loaded in the gaps between the hot plates 510 for heat-pressing purposes. However, in cases where there is a difference between the sizes of the right and left groups of the hot plates 510, the positions of the hydraulic cylinders 513 and 514 are adjusted prior to a sheet loading operation.

Figure 34:
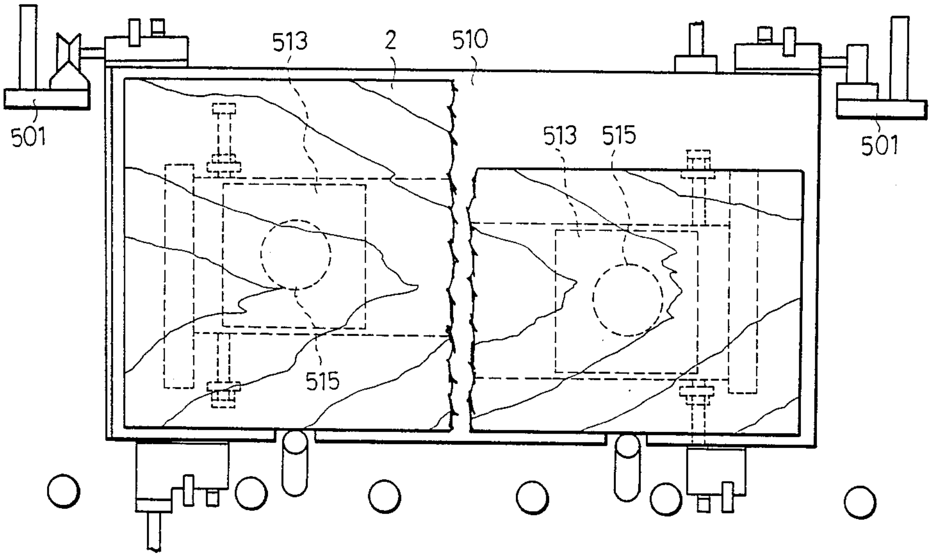
FIGS. 34 and 35 are illustrations respectively used as an aid to explain the movements of hydraulic cylinders and rams thereof in accordance with the present invention.

For example, it is assumed that the left group of the unprocessed sheets 2 each have the size shown at the left in FIG. 34 while the right group of the unprocessed sheets 2 each have the size shown at the right in FIG. 34. The two groups differ in size in the vertical direction only. Thus, stepping screws 523 are screwed to adjust the vertical positions of the hydraulic cylinders 513, 514 and the rams 515, 516, thereby centering the pressure point.

Figure 35:
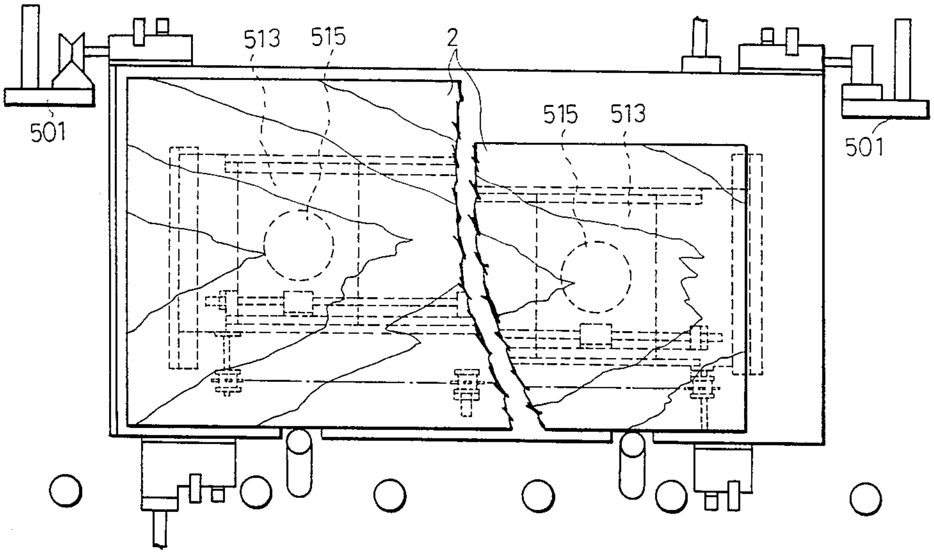
Figure 36:
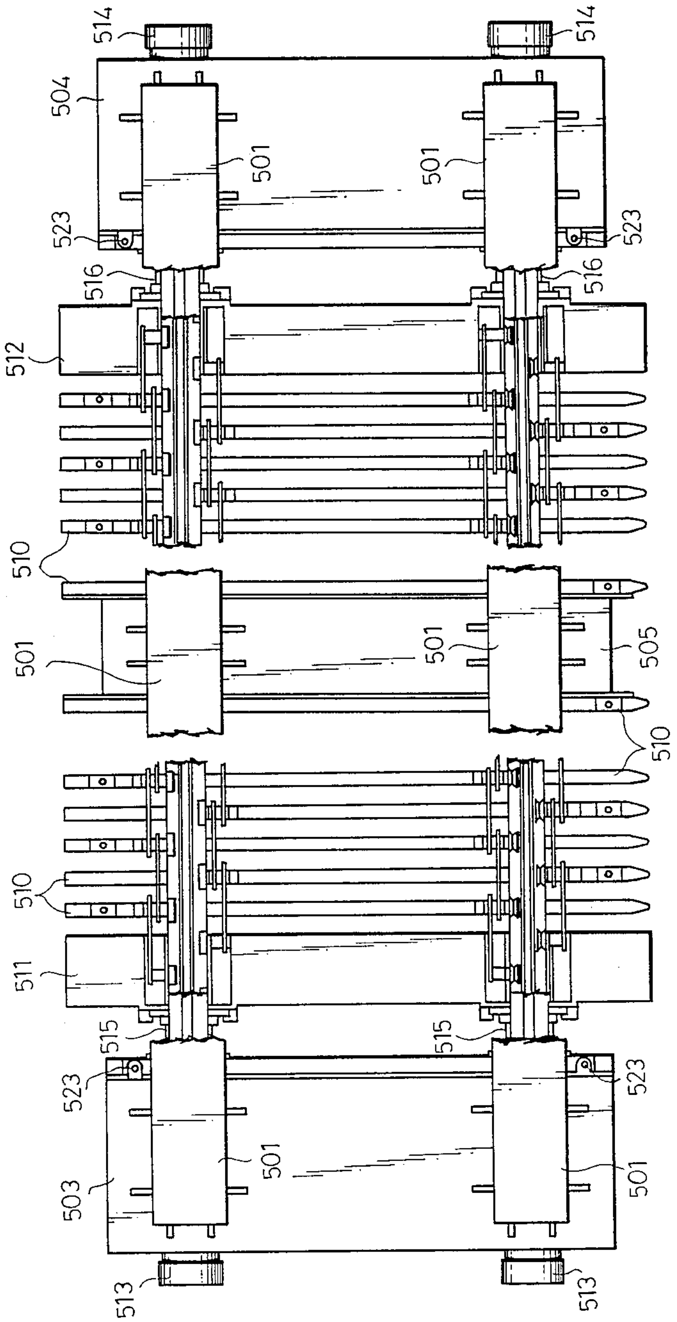
FIG. 36 is a partially cutaway, plan view schematically showing another example of the fifth preferred embodiment.
Figure 37:
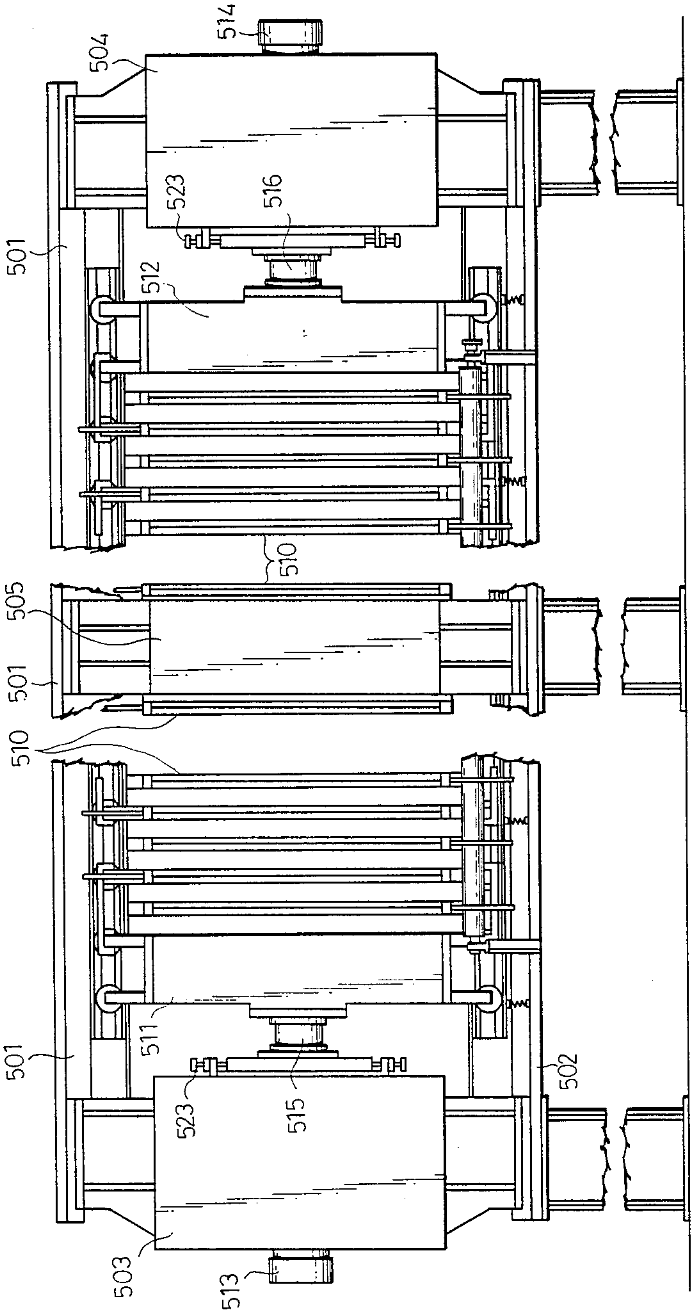
FIG. 37 is a side elevational view of the example shown in FIG. 36.

Also, in cases where the length and width of the unprocessed sheets 2 to be loaded in the gaps between the right hot plates 510 are reduced relative to the unprocessed sheets 2 to be loaded in the gaps between the left hot plates 510, the hydraulic cylinders 513, 514 and the rams 515, 516 are simultaneously moved laterally as well as vertically as shown in FIG. 35.

It is to be noted that, in cases where the left and right groups of the unprocessed sheets 2 to be loaded on both sides of the central frame 505 differ in size and thickness and time required for heat-pressing differs on both sides, the aforesaid sheet unloading operation is separately performed on each side.

In the fifth embodiment described above, since the upper and lower lateral beams are supported generally at their central portions by the central frame, even if the number of hot plates employed is increased, deflection and a bending stress can be suppressed and an easy construction is achieved.

In addition, it is possible to provide a difference between the sizes and thicknesses of the unprocessed sheets to be loaded into the gaps between the hot plates on the opposite sides of the central frame, and also, the left and right components can be simultaneously or separately operated for heat-pressing purposes.

Figure 38:
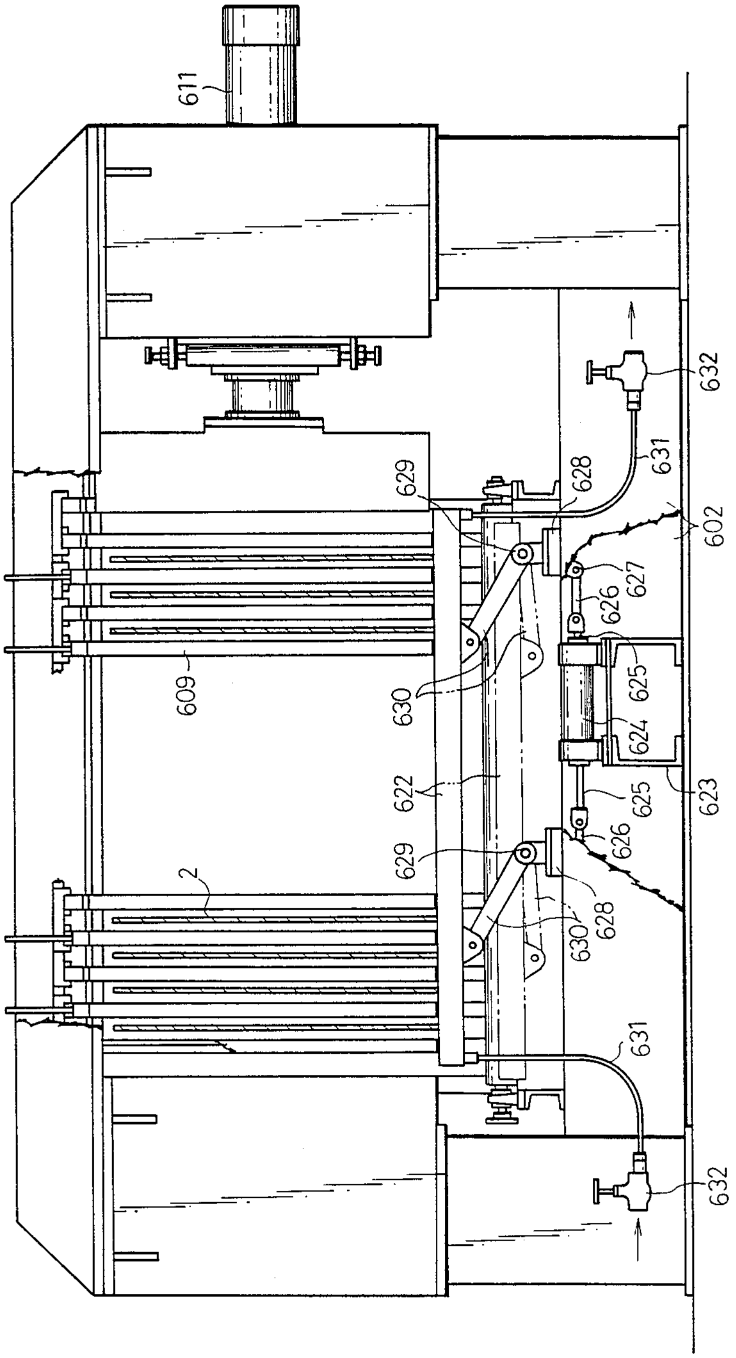
FIG. 38 is a partially cutaway, side elevational view schematically showing a sixth preferred embodiment of the present invention.
Figure 41:
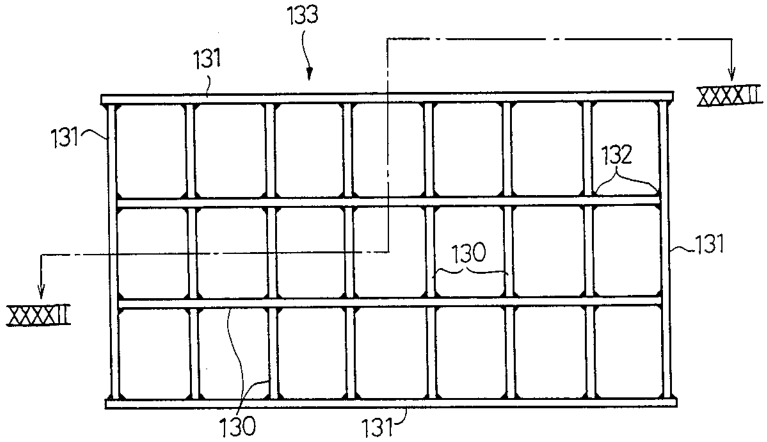
FIG. 41 is a schematic, front elevational view of an example of the related art.
Figure 39:
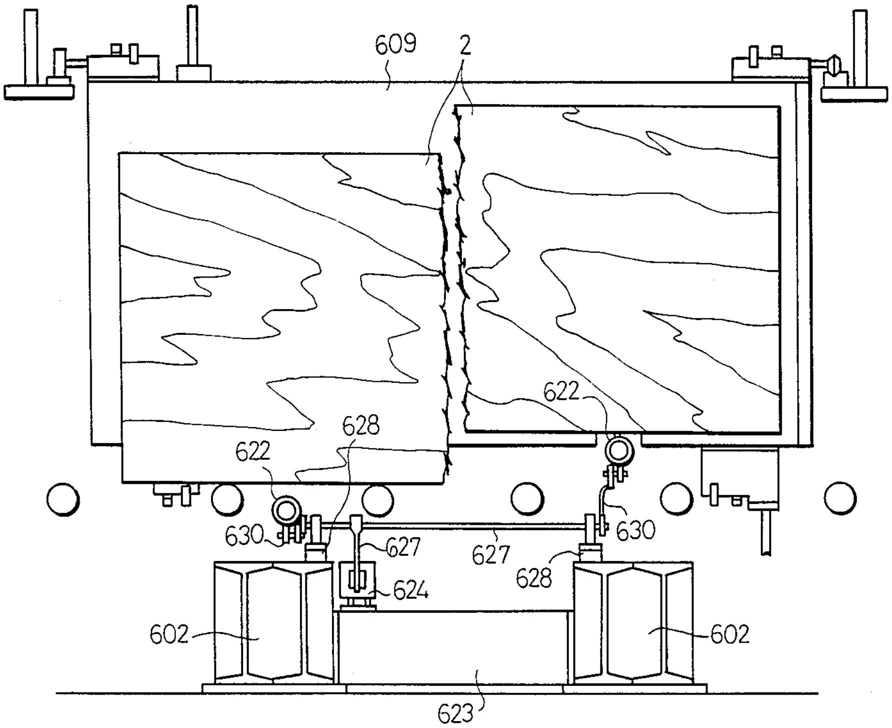
FIG. 39 is a front elevational view schematically showing the sixth embodiment shown in FIG. 38.
Figure 42:
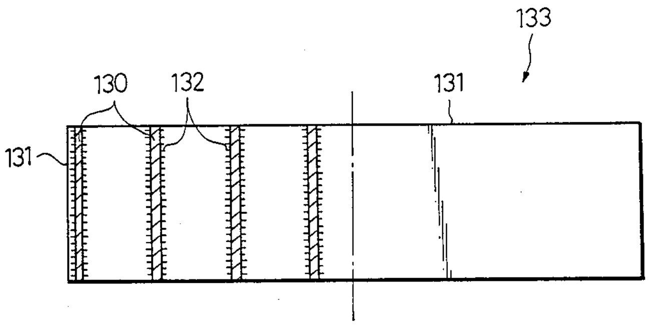
FIG. 42 is a view taken along line XXXXII—XXXXII of FIG. 41.
Figure 40:
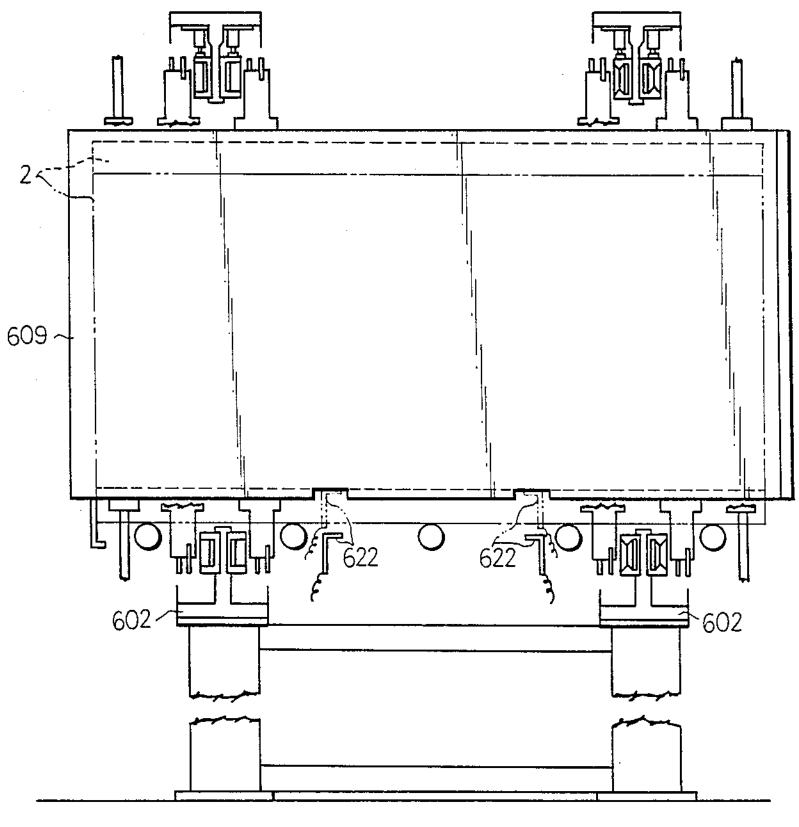
FIG. 40 is a front elevational view schematically showing another example of the sixth embodiment of the present invention.

The sixth preferred embodiment of the present invention will be described below with reference to FIGS. 38 to 40.

A supporting frame 623 is provided transversely between lower lateral beams 602, and a lifting hydraulic cylinder 624 of a dual rod type is fixed to the supporting frame 623. Levers 627 are pin-connected to the respective distal ends of the piston rods 625 by links 626. The other ends of these levers 627 are pivotally connected to a pair of shafts 629 supported between the lower lateral beams 602 by bearings 628. Arms 630 are pin-connected to the shafts 629, and the other ends of the arms 630 are pivotally attached to a pair of hollow lifters 622.

Flexible pipes 631 are connected to both ends of the aforesaid lifters 622, and the operation of valves 632 supplies and discharges to and from the lifters 622 heat medium such as water vapour and hot oil which is circulated in hot plates 609. Thus, the hot plates 609 and the lifters 622 are heated at substantially the same temperature.

As described above, the lifters 622 are of tubular shape having the interior to which the heating medium is supplied. Alternatively, as shown in FIG. 40, it is possible to use a long-size shape steel, such that it is heated at substantially the same temperature as the hot plates 609 by means of an electrical heating medium, and its shape and heating means may freely be selected.

The operation of the press constructed as describe above will be described below.

After the press has been closed, the unprocessed sheets 2 are heat-pressed by the heating effect provided by the hot plates 609 and the pressing effect provided by a hydraulic cylinder 611. During this heat-press operation, the water contained in the unprocessed sheets 2 are evaporated and discharged out of the hot plates 609 while the heat-pressing is being performed or shortly after the press is opened.

If the lifters 622 are at room temperatures, they are lower in temperature than the hot plates 609. Therefore, the vapor which has been discharged is condensed to form droplets, and the droplets are absorbed in the vicinity of lower two points of the unprocessed sheets 2 via the lifters 622. This causes a drawback such as partial exfoliation or a residual stain.

However, since the lifters 622 are heated at substantially the same temperature as the hot plates 609, the vapor is discharged without being condensed on the portions of the lifters 622, whereby it is possible to eliminate various drawbacks affecting the unprocessed sheets 2.

While this invention has been described in conjunction with a specific embodiment thereof, it is evident that many alternatives, modifications and variations of the invention may be provided without departing from the true spirit and scope of the invention. Therefore, the above description and illustrations should not be construed as limiting the scope of the invention, which is defined solely by the appended claims.

What is claimed is:

1. A horizontal multistage press comprising:

(a) a pair of frames disposed upright in face-to-face relationship with each other;

(b) at least one upper lateral beam for coupling the upper portions of said pair of frames;

(c) at least one lower lateral beam for coupling the lower portions of said pair of frames;

(d) rail means disposed on at least one of said upper end lower lateral beams and extending along the length thereof;

(e) a multiplicity of hot plates disposed parallel to one another between said pair of frames and supported by said rail means for reciprocal movement along the length of said rail means, a multiplicity of unprocessed sheets being heat-pressed between said hot plates to produce processed sheets;

(f) at least one urging means disposed on at least one of said frames for urging said multiplicity of hot plates toward and away from one another;

(g) travel means for loading said unprocessed sheets in and unloading processed sheets from the gaps between said hot plates, said travel means including a carrying conveyor having a plurality of first rolls disposed under said hot plates, a loading conveyor having a plurality of second rolls disposed on the side on which said unprocessed sheets are loaded, and an unloading conveyor having a plurality of third rolls disposed on the side on which said processed sheets are unloaded, said first, second and third rolls having engagement means on at least one roll thereof, respectively, for engaging the lower ends of said unprocessed and processed sheets while said sheets are being maintained in an upright state so as to force said sheets between said hot plates to travel even where said sheets include defects such as unevenness, curvature and the like thereon; and stopper means adapted to adjustably engage the leading ends of said unprocessed sheets at different ones of a plurality of positions along the direction of travel of said unprocessed sheets to stop said unprocessed sheets between said hot plates at a desired one of a plurality of predefined positions corresponding to the length of said unprocessed sheets, thereby allowing sheets of different lengths to be centrally accommodated between said hot plates.

2. A horizontal multistage press according to claim 1, wherein said engagement means are the top portions of a plurality of recesses formed in said at least one roll at equal intervals in the circumferential direction of said at least one roll.

3. A horizontal multistage press according to claim 1, wherein said engagement means are projections which engage with the lower ends of said sheets.

4. A horizontal multistage press according to claim 3, wherein said projections are a plurality of knives extending along the length of said roll.

5. A horizontal multistage press according to claim 3, wherein said projections are a plurality of needle-like projections disposed in said roll at equal intervals in the circumferential direction of said roll.

6. A horizontal multistage press according to claim 3, wherein said projections are a plurality of projections inclined at a predetermined acute angle relative to the circumferential direction of said roll.

7. A horizontal multistage press according to claim 1, wherein said stopper means includes a stopper engaging with said leading ends of said unprocessed sheets and a hydraulic cylinder having a piston rod adjustable in said plurality of positions and connected to said stopper, said stopper stopping at a position among said plurality of positions in accordance with an adjustment of said piston rod.

8. A horizontal multistage press according to claim 7 further including pressure-point adjusting means disposed between said frame and the end most hot plates of said hot plates for adjusting the vertical position of said urging means so as to enable constant application of a suitable level of pressure to said unprocessed sheets in accordance with changes in the sizes of said unprocessed sheets, thereby causing the reciprocal movement of said stopper in the direction of feed thereof in linked relationship with the vertical movement of said pressure-point adjusting means.

9. A horizontal multistage press according to claim 1 further including a movable platen disposed between said frames and the endmost hot plates.

10. A horizontal multistage press according to claim 9, wherein said frames and said movable platen are lattice-like structures made of a plurality of plates, said plates provided with grooves extending inward of the side in contact with said hot plates.

11. A horizontal multistage press according to claim 9, wherein said frames and said movable platens are structures made of a plurality of steel pipes disposed adjacent and parallel to one another and perpendicular to the face of said hot plates, said steel pipes being provided with grooves extending inward of the side in contact with said hot plates.

12. A horizontal multistage press according to claim 9, wherein said structure has a plurality of sheet materials at their outer circumference, said sheet materials reinforcing the respective connections between said steel pipes.

13. A horizontal multistage press according to claim 12, wherein said steel materials cover the whole of said outer periphery of said structure.

14. A horizontal multistage press according to claim 1 further including a pair of auxiliary frames disposed on the loading and unloading sides of said hot plates and capable of moving toward and away from said hot plates, said auxiliary frames being provided with said travel means, and position adjusting means for adjusting said auxiliary frames in relation to said hot plates.

15. A horizontal multistage press according to claim 14, wherein said position adjusting means is a first hydraulic cylinder disposed at a lower portion of at least one of said auxiliary frames, the position of said auxiliary frame being determined in accordance with the stroke of a piston rod of said hydraulic cylinder.

16. A horizontal multistage press according to claim 14, further includes on said auxiliary frames:

a pair of shafts spaced apart at a predetermined interval and in the lengthwise direction of said auxiliary frames and extending in the widthwise direction of said auxiliary frame;

a pair of chains passed between the opposite ends of said shafts;

a plurality of loader racks each having one end attached to said chain and extending toward said hot plates, said plurality of loader racks being cyclically moved between said shafts together with said chain on said auxiliary frames disposed on the loading side of said hot plates and being rotated to stand said unprocessed sheets which have been laid, thereby enabling the loading of said unprocessed sheets in the gaps between said hot plates; and a plurality of unloader racks each having one end attached to said chain and extending toward said hot plates, said plurality of unloader racks being cyclically moved between said shafts together with said chain on said auxiliary frame disposed on the unloading side of said hot plates and being rotated to lay said unprocessed sheets which have been stood, thereby sequentially unloading said processed sheets for piling purposes.

17. A horizontal multistage press according to claim 16, wherein recessed and projecting portions are respectively formed for engagement with each other on the sides of said loader racks and said hot plates which are opposite to each other while recessed and projecting portions are respectively formed for engagement with each other on the other sides of said unloader racks and said hot plates which are opposite to each other, the engagement with said recessed portions and projecting portions allowing said unprocessed sheets to be loaded in the gaps between said hot plates or said processed sheets to be unloaded from said hot plates.

18. A horizontal multistage press according to claim 1, wherein a central frame for supporting said upper and lower lateral beams are disposed at an intermediate location between said pair of frames.

19. A horizontal multistage press according to claim 18, wherein said hot plates are disposed on both sides of said central frame in the direction of the thickness thereof, whereby it is possible to simultaneously and separately press said unprocessed sheets of different kinds on both sides of said central frame.

20. A horizontal multistage press according to claim 1 further including a pair of cutouts formed in the respective lower ends of said hot plates and spaced apart at a predetermined interval in the direction of travel of said sheets and a pair of lifters inserted into said cutouts when said hot plates are separated from each other.

21. A horizontal multistage press according to claim 20, wherein said respective lifters are hollow and are maintained at substantially the same temperature as the temperature of said hot plates by a heating medium supplied to the interiors of said lifters.

22. A horizontal multistage press comprising:

(a) a pair of frames disposed upright in face-to-face relationship with each other;

b) a multiplicity of hot plates disposed parallel to one another for reciprocal movement between said pair of frames, said hot plates heat-pressing a multiplicity of unprocessed sheets therebetween;

(c) urging means disposed on at least one of said frames for urging said multiplicity of hot plates toward and away from one another;

(d) means for advancing a multiplicity of sheets between said hot plates in a direction parallel to said hot plates; and (e) stopper means adapted to adjustably engage the leading ends of said unprocessed sheets at different ones of a plurality of positions along the direction of travel of said unprocessed sheets to stop said unprocessed sheets between said hot plates at a desired one of a plurality of predefined positions corresponding to the length of said unprocessed sheets, thereby allowing sheets of different lengths to be centrally accommodated between said hot plates.

23. A horizontal multistage press according to claim 22 further including pressure-point adjusting means disposed between said frame and the endmost hot plates of said hot plates, for adjusting the vertical position of said urging means so as to enable constant application of a suitable level of pressure to said unprocessed sheets in accordance with changes in the size of said unprocessed sheets, thereby causing the reciprocal movement of said stopper in the direction of travel of said sheets in linked relationship with the vertical movement of said pressure-point adjusting means.

24. A horizontal multistage press according to claim 23 further including a movable platen disposed between said frames and said endmost hot plates.

25. A horizontal multistage press according to claim 22, wherein said stopper means includes a stopper engaging with said leading ends of said unprocessed sheets and a hydraulic cylinder having a piston rod adjustable in said plurality of positions and connected to said stopper, said stopper stopping at a position among said plurality of positions in accordance with an adjustment of said piston rod.

26. A horizontal multistage press comprising:

(a) a pair of frames disposed upright in face-to-face relationship;

(b) a multiplicity of hot plates disposed parallel to one another and capable of moving reciprocally between said frames; and (c) movable platens disposed in the respective spaces between said frames and the endmost hot plates, said movable platens respectively being structures composed of a plurality of steel pipes adjacent and parallel to one another and perpendicular to the face of said hot plates, said steel pipes having grooves extending inward of the side of said steel pipes in contact with said hot plates.

27. A horizontal multistage press according to claim 26, wherein said frames are structures composed of a plurality of steel pipes adjacent and parallel to one another and perpendicular to the face of said hot plates, said steel pipes having grooves extending inward of the side of said steel pipes facing said hot plates.

28. A horizontal multistage press according to claim 26, which includes couplings on said steel pipes, and wherein a plurality of plates for reinforcing said couplings are disposed on the outer periphery of said structure.

* * * * *